United States Patent
Park et al.

(10) Patent No.: US 7,796,233 B2
(45) Date of Patent: Sep. 14, 2010

(54) LIQUID CRYSTAL DISPLAY AND MANUFACTURING METHOD THEREOF

(75) Inventors: So-Youn Park, Suwon-si (KR);
Bong-Sung Seo, Yongin-si (KR);
Jeong-Uk Heo, Seongnam-si (KR);
Byoung-Hun Sung, Seoul (KR);
Baek-Kyun Jeon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 619 days.

(21) Appl. No.: 11/586,131

(22) Filed: Oct. 25, 2006

(65) Prior Publication Data

US 2007/0097312 A1    May 3, 2007

(30) Foreign Application Priority Data

Oct. 28, 2005   (KR) .................. 10-2005-0102363
Dec. 29, 2005   (KR) .................. 10-2005-0133584

(51) Int. Cl.
*G02F 1/1339* (2006.01)
(52) U.S. Cl. .................................. 349/155
(58) Field of Classification Search ............... None
See application file for complete search history.

(56) References Cited

U.S. PATENT DOCUMENTS

| | | | |
|---|---|---|---|
| 6,801,289 B2 * | 10/2004 | Ichioka et al. | 349/152 |
| 7,499,142 B2 * | 3/2009 | Jeon et al. | 349/155 |
| 2006/0290877 A1 * | 12/2006 | Jeon et al. | 349/187 |
| 2007/0002262 A1 * | 1/2007 | Kawabe | 349/155 |
| 2007/0008479 A1 * | 1/2007 | Suh et al. | 349/155 |
| 2007/0263165 A1 * | 11/2007 | Sung et al. | 349/187 |

FOREIGN PATENT DOCUMENTS

JP    11-305241    11/1999
JP    2002-49041   2/2002

* cited by examiner

*Primary Examiner*—Sung H Pak
(74) *Attorney, Agent, or Firm*—F. Chau & Associates, LLC

(57) ABSTRACT

A liquid crystal display includes a first substrate having a display area and a peripheral area and including a plurality of pixels formed in the display area, a second substrate facing the first substrate, and a plurality of first groups of bead spacers and a plurality of second groups of bead spacers disposed between the first substrate and the second substrate. The first groups of bead spacers have a different size or different elasticity coefficient than the second groups of bead spacers, and include a plurality of bead spacers, respectively.

26 Claims, 22 Drawing Sheets

LIQUID CRYSTAL DISPLAY AND MANUFACTURING METHOD THEREOF

CROSS-REFERENCE TO RELATED PATENT APPLICATION

This application claims priority to Korean Patent Application Nos. 10-2005-0102363 filed on Oct. 28, 2005 and 10-2005-0133584 filed on Dec. 29, 2005, in the Korean Intellectual Propery Office, the disclosures of which are incorporated by reference herein in their entirety.

BACKGROUND OF THE INVENTION (a) Technical Field

The present disclosure relates to a liquid crystal display and a manufacturing method thereof.

(b) Discussion of the Related Art

A liquid crystal display (LCD) is one of the most widely used flat panel displays. An LCD includes two display panels provided with field-generating electrodes such as pixel electrodes and a common electrode, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

The two display panels of the LCD are combined together by a sealant which is formed on each circumferential edge of the display panels to seal a liquid crystal material therein, and the two display panels are supported by spacers provided therebetween to sustain a cell gap therebetween.

The spacers can be categorized as spherical bead spacers formed in an irregular pattern and column spacers formed in a uniform pattern.

The column spacers are formed in a desired pattern corresponding to portions inside pixels where light is not transmitted, namely, for example, at a channel portion, a gate line, a storage electrode line, or a light blocking member, after coating a photosensitive film on a color filter array panel and then exposing and developing it.

The bead spacers are formed by spreading them irregularly before the two display panels are coupled together. However, when the bead spacers are formed in this way, the bead spacers may act as foreign particles causing light leakage which deteriorates the contrast ratio, or some bead spacers may move slightly, damaging an alignment layer.

The two display panels of an LCD are combined by fixing them to face each other using an unhardened sealant and hardening the unhardened sealant using light or heat. The liquid crystal material may be contaminated by contacting the unhardened sealant during an assembly process for combining the two display panels, causing defective alignment of the liquid crystal. Accordingly, a dam may be formed at the circumference of one display panel and the liquid crystal material may be enclosed by the dam to prevent the liquid crystal material from contacting the unhardened sealant.

However, the dam may have a non-uniform height, allowing the liquid crystal material to move to the unhardened sealant through low portions of the dam. Also, additional processes for manufacturing the dam cause manufacturing time and cost of an LCD to increase.

SUMMARY OF THE INVENTION

A liquid crystal display according to an exemplary embodiment of the present invention includes a first substrate having a display area and a peripheral area and including a plurality of pixels formed in the display area, a second substrate facing the first substrate, and a plurality of first groups of bead spacers and a plurality of second groups of bead spacers disposed between the first substrate and the second substrate. The first groups of bead spacers and the second groups of bead spacers have a different size or different elasticity coefficient from each other, and include a plurality of beads, respectively.

The liquid crystal display may further include a plurality of light blocking members formed on the second substrate and overlapping the second groups of bead spacers.

The first bead spacers and the second bead spacers may not overlap each other.

The first groups of bead spacers may be disposed near the center of the display area, and the second groups of bead spacers may be disposed about edges of the display area.

The first groups of bead spacers and the second groups of bead spacers may be disposed in the display area and may be arranged by one per six pixels, respectively.

The first groups of bead spacers and the second groups of bead spacers disposed in the display area may be arranged alternately by one per three pixels.

The first groups of bead spacers and the second groups of bead spacers may be disposed on the first substrate and the second substrate, respectively.

The first groups of bead spacers and the second groups of bead spacers may be attached to one of the first and second substrates.

The liquid crystal display may further include a gate line and a data line formed on the first substrate, a thin film transistor connected to the gate line and the data line, and a pixel electrode connected to the thin film transistor.

The liquid crystal display may further include a color filter formed on the second substrate and a common electrode formed on the color filter.

The beads of the first groups of bead spacers may be smaller than the beads of the second groups of bead spacers.

The beads of the first groups of bead spacers may have a lower elasticity coefficient than that of the beads of the second groups of bead spacers.

The liquid crystal display may further include a sealing member disposed at an edge of the peripheral area, wherein the first and second substrates are combined.

The second groups of bead spacers may be disposed near the center of the display area and in the peripheral area between the display area and the sealing member, and the first groups of bead spacers may be disposed at an edge of the display area and in the peripheral area between the display area and the sealing member.

The first groups of bead spacers and the second groups of bead spacers may be disposed in the peripheral area between the display area and the sealing member may be alternately arranged at regular intervals.

The first groups of bead spacers and the second groups of bead spacers disposed in the display area may be arranged by one per three pixels, and the first groups of bead spacers and the second groups of bead spacers disposed in the peripheral area between the display area and the sealing member may be closely and alternately arranged.

A manufacturing method of a liquid crystal display in an exemplary embodiment of the present invention includes attaching first groups of bead spacers on a first bead supply substrate, transcribing the first groups of bead spacers of the first bead supply substrate onto the surface of a first transcribing roller, transcribing the first groups of bead spacers of the first transcribing roller onto a first substrate, attaching second groups of bead spacers on a second bead supply substrate, transcribing the second groups of bead spacers of the second bead supply substrate onto the surface of a second transcribing roller, transcribing the second groups of bead spacers of the second transcribing roller onto the second substrate, depositing a liquid crystal material onto at least one of the first and second substrates, and combining the first substrate and the second substrate.

The first and the second bead supply substrates may have a plurality of holes, and the attaching the first groups of bead spacers or the second groups of bead spacers may include injecting beads of the first or second bead spacers into the holes.

The first groups of bead spacers and the second groups of bead spacers may be spacers that maintain a constant cell gap between the first substrate and the second substrate.

The first groups of bead spacers and the second groups of bead spacers may be dams that control a speed of the liquid crystal material.

The first groups of bead spacers and the second groups of bead spacers may be attached to the first and second spacer supply substrates with an adhesive.

The adhesive may include a thermosetting material or an ultraviolet hardener.

The method may further include exposing the first substrate to heat or light after transcribing the first groups of bead spacers of the first transcribing roller onto the first substrate.

The method may further include exposing the second substrate to heat or light after transcribing the second groups of bead spacers of the second transcribing roller onto the second substrate.

The holes of the first bead supply substrate may have a different size from the holes of the second bead supply substrate.

The holes of the first bead supply substrate and the holes of the second bead supply substrate may be filled with a plurality of beads.

The first groups of bead spacers may have a different size or a different elasticity coefficient from the second groups of bead spacers.

The first groups of bead spacers and the second groups of bead spacers may not overlap with each other.

DETAILED DESCRIPTION OF EXEMPLARY EMBODIMENTS

Figure 1:
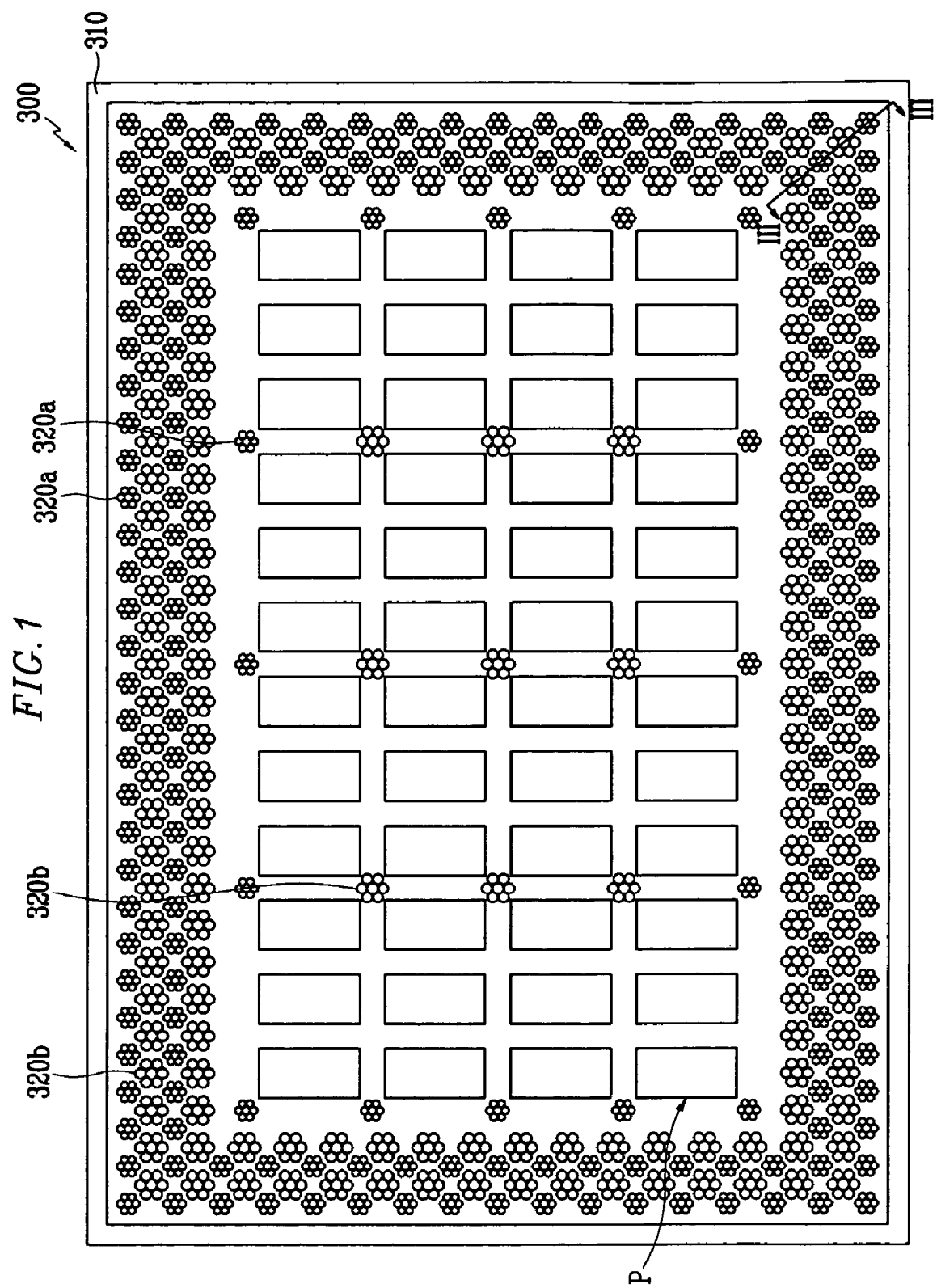
FIG. 1 is a schematic diagram of an LCD according to an exemplary embodiment of the present invention.

Hereinafter, exemplary embodiments of the present invention will be described in detail with reference to the accompanying drawings. This invention may, however, be embodied in different forms and should not be construed as limited to the embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present.

A liquid crystal display according to an exemplary embodiment of the present invention will now be described in detail with reference to FIG. 1 to FIG. 3.

Figure 2:
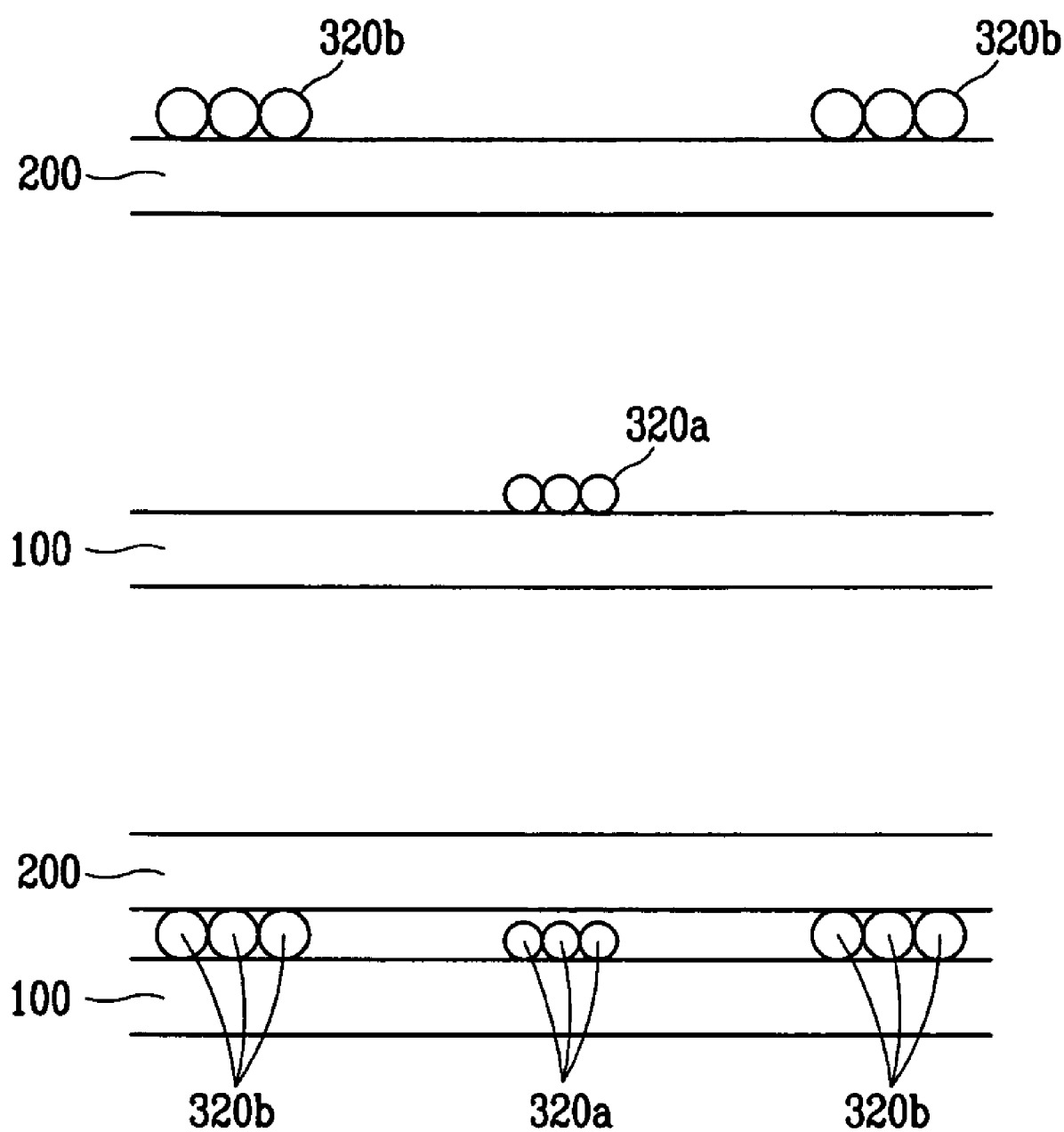
FIG. 2 is a sectional view of an LCD including a thin film transistor array panel and a common electrode panel, and spacers disposed thereon, respectively.
Figure 3:
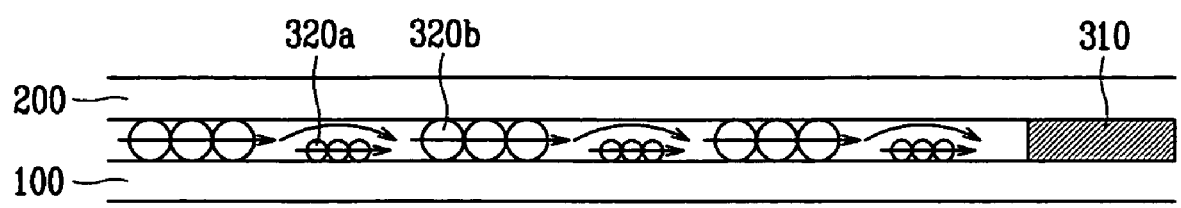
FIG. 3 is a sectional view of the LCD shown in FIG. 1 taken along the line III-III.

FIG. 1 is a schematic diagram of an LCD according to an exemplary embodiment of the present invention, FIG. 2 is a sectional view of an LCD including a thin film transistor array panel and a common electrode panel, and spacers disposed thereon, respectively, and FIG. 3 is a sectional view of the LCD shown in FIG. 1 taken along the line III-III. An arrow in FIG. 3 represents a movement direction of a liquid crystal material after the liquid crystal material is deposited.

Referring to FIG. 1, the LCD 300 includes a sealing member 310 disposed in the outermost portion of the LCD 300, and a plurality of pixels P disposed thereinside. A region of the LCD 300 provided with a plurality of pixels P is referred to as a display area, and the remaining region is referred to as a peripheral area, hereinafter.

A plurality of groups of small bead spacers 320a are disposed around the display area edge, while a plurality of groups of large bead spacers 320b are disposed in the display area. However, dispositions of the groups of bead spacers 320a and 320b may be changed.

A plurality of groups of small bead spacers 320a and a plurality of groups of large bead spacers 320b are alternately disposed in the peripheral area between the display area and the sealing member 310 at regular intervals.

Referring to FIG. 2, the groups of small bead spacers 320a are disposed on a thin film transistor array panel 100, while groups of large bead spacers 320b are disposed on a common electrode panel 200. However, the groups of bead spacers 320a and 320b may be disposed together on one panel of the TFT array panel 100 and the common electrode panel 200.

Each group of bead spacers 320a and 320b may be disposed on a region corresponding to a light blocking member (not shown). A plurality of beads, for example six to eight beads of the same size, may be in each group of the bead spacers 320a and 320b. The number of beads in the group of spacers 320a and 320b may be less than six or more than eight, and a shape of the group of spacers 320a and 320b may be variable such as a quadrangle, etc.

A plurality of groups of small bead spacers 320a and a plurality of groups of large bead spacers 320b may be alternately disposed in the peripheral area between the display area and the sealing member 310 at regular intervals.

As shown by the arrow in FIG. 3, when the liquid crystal material moves from the display area to the outside of the display area, the liquid crystal material repeatedly passes by the large bead spacers 320b through a gap in the large bead spacers 320b and passes over or around the small bead spacers 320a to reach the sealing member 310. Accordingly, the velocity of the liquid crystal material in the peripheral area between the display area and the sealing member 310 may be reduced substantially to prevent the liquid crystal material from contacting the sealing member 310 before the sealing member 310 is hardened. A plurality of bead spacers 320a and 320b are disposed in the peripheral area between the display area and the sealing member 310 at regular intervals and in a regular sequence to maintain substantially the same velocity of the liquid crystal material in several directions while moving the liquid crystal material toward the sealing member 310.

In addition, the velocity of the liquid crystal material in the several directions may be maintained such that the liquid crystal material may reach the sealing member 310 substantially simultaneously in the several directions to prevent uneven distribution of the liquid crystal material in the LCD 300 and to maintain a constant cell gap.

As shown in FIG. 1, an LCD according to an exemplary embodiment of the present invention includes a plurality of groups of bead spacers 320a and 320b arranged by one per three pixels. However, the groups of bead spacers 320a and 320b may be arranged at a variable interval of pixels.

In an LCD, a pressure applied to a central portion of a display area may be much more than that applied to the outer portion of the display area, and thereby the cell gap in the central portion may be shorter than that in the outer portion. Accordingly, the cell gap may not be constantly maintained. The LCD 300 according to an exemplary embodiment of the present invention includes groups of large bead spacers 320b disposed in the central portion of the display area and groups of small bead spacers 320a disposed in the outer portion to maintain a constant cell gap in the entire display area.

In addition, the liquid crystal material may be unevenly distributed toward the outer portion of the display area during deposition of the liquid crystal material, and thereby a cell gap in the outer portion may be longer than that in the central portion. Accordingly, the disposition and size of the bead spacers 320a and 320b may be variable such that groups of large bead spacers 320b may be disposed in the outer portion and groups of small bead spacers 320a may be disposed in the central portion. In addition, groups of bead spacers having the same size and different elasticity from each other may be used.

Figure 4:
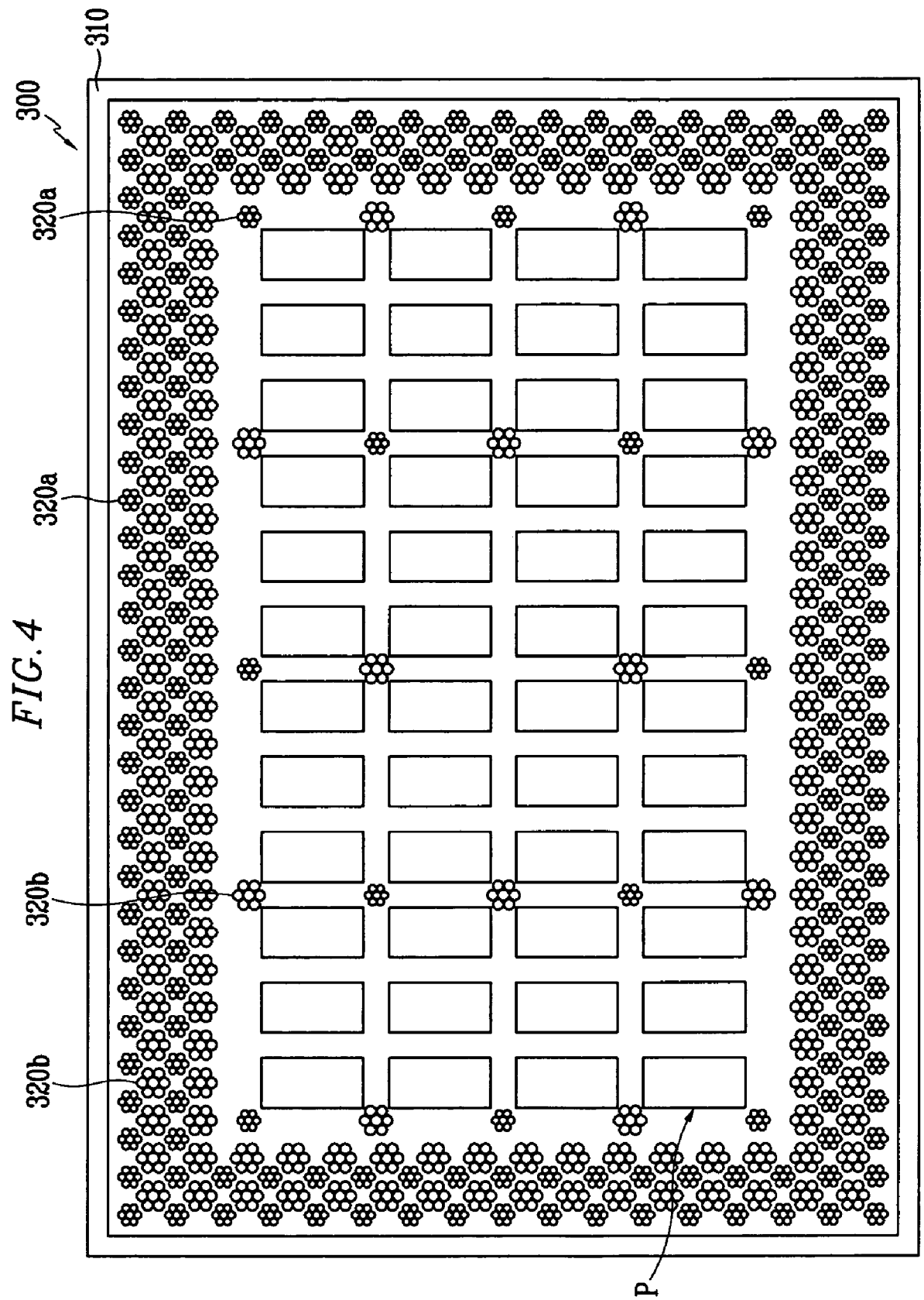
FIG. 4 is a schematic diagram of an LCD according to an exemplary embodiment of the present invention.

An LCD according to an exemplary embodiment of the present invention will now be described in detail with reference to FIG. 4. FIG. 4 is a schematic diagram of an LCD according to an exemplary embodiment of the present invention.

As shown in FIG. 4, the planar structure of the LCD 300 is the same as that shown in FIG. 1. The LCD 300 includes a sealing member 310 disposed in the outermost portion of the LCD 300, a plurality of pixels P disposed inside of the LCD 300, and a plurality of groups of bead spacers 320a and 320b disposed in the peripheral area between the display area and the sealing member 310 at a constant interval.

However, unlike the LCD shown in FIG. 1, a plurality of groups of small bead spacers 320a and a plurality of groups of large bead spacers 320b are alternately disposed in the display area.

The LCD 300 includes a plurality of groups of bead spacers 320a and 320b having different sizes and being alternately disposed to maintain a constant cell gap that is changeable locally and a uniform distribution of the liquid crystal material in the display area.

The groups of large bead spacers 320b maintain the constant cell gap when the two display panels are assembled after depositing the liquid crystal material, and the groups of small bead spacers 320a prevent the elasticity of the large bead spacers 320b from allowing the bead spacers 320b to compress beyond a certain point by supporting the two display panels when local pressure is applied to the display panels.

Figure 5:
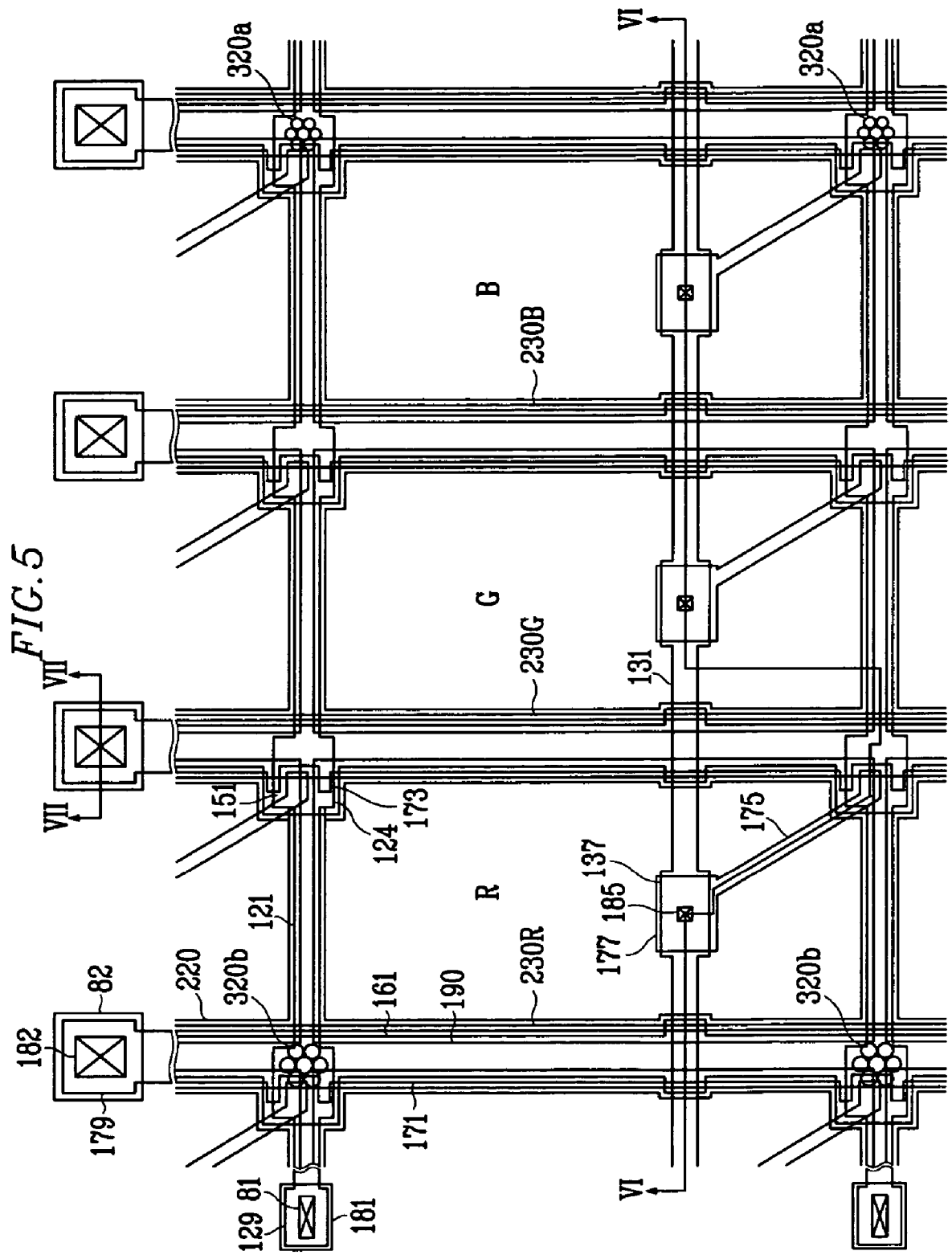
FIG. 5 is a layout view of an LCD according to an exemplary embodiment of the present invention.
Figure 6:
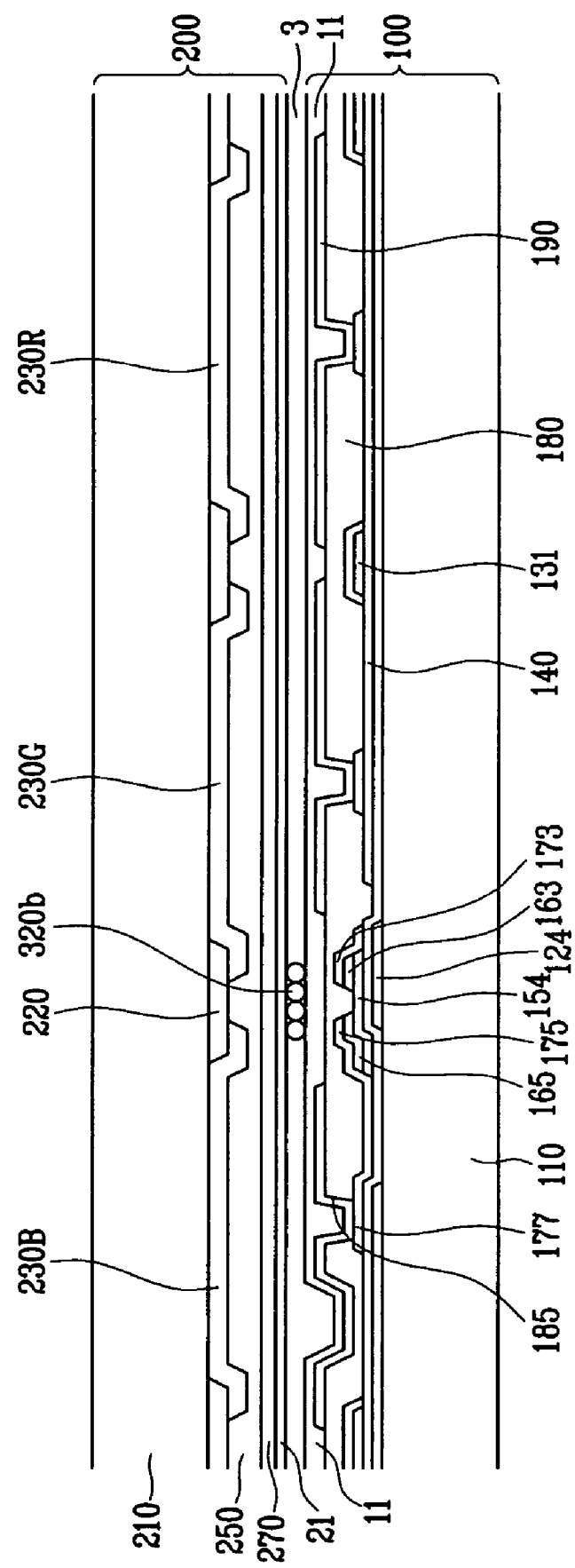
FIG. 6 is a sectional view of the LCD shown in FIG. 5 taken along the line VI-VI.
Figure 7:
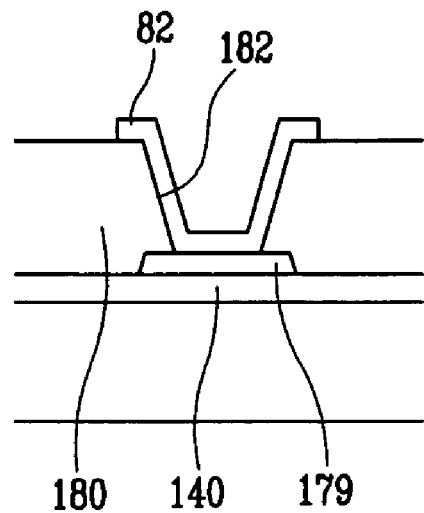
FIG. 7 is a sectional view of the LCD shown in FIG. 5 taken along the line VII-VII.

An LCD according to an exemplary embodiment of the present invention will be described in detail with reference to FIG. 5 to FIG. 7. FIG. 5 is a layout view of an LCD according to an exemplary embodiment of the present invention, FIG. 6 is a sectional view of the LCD shown in FIG. 5 taken along the line VI-VI, and FIG. 7 is a sectional view of the LCD shown in FIG. 5 taken along the line VII-VII.

The LCD includes a thin film transistor (TFT) array panel 100 and a common electrode panel 200 facing each other, and an LC layer 3 interposed therebetween.

A plurality of gate lines 121 and a plurality of storage electrode lines 131 are formed on an insulating substrate 110 made of a material such as transparent glass or plastic.

The gate lines 121 transmit gate signals and extend substantially in a transverse direction. Each of the gate lines 121 includes a plurality of gate electrodes 124 projecting downward and an end portion 129 having an area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated on the substrate 110. The gate lines 121 may extend to connect to a driving circuit that may be integrated on the substrate 110.

The storage electrode lines 131 are supplied with a predetermined voltage, and extend substantially parallel to the gate lines 121. Each of the storage electrode lines 131 are disposed between two pair of adjacent gate lines 121, and are closer to one of the pair of two adjacent gate lines 121. Each of the storage electrode lines 131 include a storage electrode 137 extending upward and downward. However, the storage electrode lines 131 may have various shapes and arrangements.

The gate lines 121 and storage electrode lines 131 may be made of a material containing Ag, Cu, Mo, Cr, Ta, Ti or alloys thereof. However, they may have a multi-layered structure including two conductive films (not shown) having different physical characteristics. One of the two films may be made of a low resistivity metal including an Al, Ag, Cu, or alloys thereof for reducing signal delay or voltage drop. The other film may be made of a material such as a Mo, Cr, Ta, Ti, or alloys thereof having good physical, chemical, and electrical contact characteristics with other materials such as indium tin oxide (ITO) or indium zinc oxide (IZO). Examples of the combination of the two films are a lower Cr film and an upper Al (alloy) film, and a lower Al (alloy) film and an upper Mo (alloy) film. However, the gate lines 121 and the storage electrode lines 131 may be made of various metals or conductors.

The lateral sides of the gate lines 121 and the storage electrode lines 131 are inclined relative to a surface of the substrate 110, and the inclination angle thereof may range from about 30 to about 80 degrees.

A gate insulating layer 140 may be made of silicon nitride (SiNx) or silicon oxide (SiOx) and is formed on the gate lines 121 and the storage electrode lines 131.

A plurality of semiconductor stripes 151 may be made of hydrogenated amorphous silicon (abbreviated to "a-Si") or polysilicon and are formed on the gate insulating layer 140. Each of the semiconductor stripes 151 extends substantially in a longitudinal direction and includes a plurality of projections 154 branching out toward the gate electrodes 124.

A plurality of ohmic contact stripes and islands 161 and 165 are formed on the semiconductor stripes 151. The ohmic contacts 161 and 165 may be made of n+ hydrogenated a-Si heavily doped with an n-type impurity such as phosphorous, or they may be made of silicide. Each of the ohmic contact stripes 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof may range from about 30 to about 80 degrees.

A plurality of data lines 171 and a plurality of drain electrodes 175 are formed on the ohmic contacts 161 and 165 and the gate insulating layer 140.

The data lines 171 transmit data signals and extend substantially in the longitudinal direction to intersect the gate lines 121. Each data line 171 includes a plurality of source electrodes 173 projecting toward the gate electrodes 124 and curved like a character C, and an end portion 179 having an area for contact with another layer or an external driving circuit. A data driving circuit (not shown) for generating the data signals may be mounted on an FPC film (not shown), which may be attached to the substrate 110, directly mounted on the substrate 110, or integrated on the substrate 110. The data lines 171 may extend to connect to a driving circuit that may be integrated on the substrate 110.

The drain electrodes 175 are separated from the data lines 171, and are disposed opposite the source electrodes 173 with respect to the gate electrodes 124. Each of the drain electrodes 175 includes a wide end portion 177 and a narrow end portion. The wide end portion 177 overlaps a storage electrode 137 and the narrow end portion is partly enclosed by a source electrode 173.

A gate electrode 124, a source electrode 173, and a drain electrode 175 along with a projection 154 of a semiconductor stripe 151 form a TFT having a channel formed in the projection 154 and are disposed between the source electrode 173 and the drain electrode 175.

The data lines 171 and the drain electrodes 175 may be made of a refractory metal such as Cr, Mo, Ta, Ti, or alloys thereof. However, they may have a multilayered structure including a refractory metal film (not shown) and a low resistivity film (not shown). Examples of the multi-layered structure are a double-layered structure including a lower Cr/Mo (alloy) film and an upper Al (alloy) film, and a triple-layered structure of a lower Mo (alloy) film, an intermediate Al (alloy) film, and an upper Mo (alloy) film. However, the data lines 171 and the drain electrodes 175 may be made of various metals or conductors.

The data lines 171 and the drain electrodes 175 have inclined edge profiles, and the inclination angles thereof may range from about 30 to about 80 degrees.

The ohmic contacts 161 and 165 are interposed between the underlying semiconductor stripes 151 and the overlying conductors 171 and 175 thereon, and reduce the contact resistance therebetween. Although the semiconductor stripes 151 are narrower than the data lines 171 at most places, the width of the semiconductor stripes 151 becomes large near the gate lines 121 and the storage electrode lines 131, to smooth the profile of the surface, thereby preventing disconnection of the data lines 171. The semiconductor stripes 151 include some exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 may be made of an inorganic or organic insulator, and it may have a flat top surface. Examples of the inorganic insulator include silicon nitride and silicon oxide. The organic insulator may have photosensitivity and a dielectric constant of less than about 4.0. The passivation layer 180 may include a lower film of an inorganic insulator and an upper film of an organic insulator such that it takes the insulating characteristics of the organic insulator while preventing the exposed portions of the semiconductor stripes 151 from being damaged by the organic insulator.

The passivation layer 180 has a plurality of contact holes 182 and 185 exposing the end portions 179 of the data lines 171 and the drain electrodes 175, respectively. The passivation layer 180 and gate insulating layer 140 have a plurality of contact holes 181 exposing the end portions 129 of the gate lines 121.

A plurality of pixel electrodes 190 and a plurality of contact assistants 81 and 82 are formed on the passivation layer 180. They may be made of transparent conductor such as ITO or IZO or a reflective conductor such as Ag, Al, Cr, or alloys thereof.

The pixel electrodes 190 are electrically connected to the drain electrodes 175 through the contact holes 185 such that the pixel electrodes 190 receive data voltages from the drain electrodes 175. The pixel electrodes 190 supplied with the data voltages generate electric fields in cooperation with a common electrode 270 of an opposing display panel 200 supplied with a common voltage, which determine the orientations of liquid crystal molecules (not shown) of a liquid crystal layer 3 disposed between the two electrodes. Polarization of light traveling through the LC layer is adjusted depending on the determined orientations of the LC molecules in the LC layer. A pixel electrode 190 and the common electrode 270 form a capacitor referred to as a "liquid crystal capacitor," which stores applied voltages after the TFT is turned off.

The pixel electrode 190 and the drain electrode 175 connected thereto overlap a storage electrode line 131 an a storage electrode 137. The pixel electrode 190, a drain electrode 175 connected thereto, and the storage electrode line 131 form an additional capacitor referred to as a "storage capacitor," which enhances the voltage storing capacity of the liquid crystal capacitor.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

A lower alignment layer 11 is formed on the pixel electrodes 190 and passivation layer 180.

A plurality of groups of bead spacers 320a are formed on the lower alignment layer 11. The groups of bead spacers 320a may be formed in a region corresponding to a light blocking member 220 disposed on the common electrode panel 200. Six to eight beads are gathered to form the group of the bead spacers 320a having a round shape. The beads may be the same size. In addition, the number of beads in the group of the bead spacers 320a may be less than six or more than eight, and a shape of the group of the bead spacers 320a may be changed such as to a quadrangle, etc The groups of bead spacers 320a are arranged by one per six pixels, but the groups of bead spacers 320a may also be arranged at variable intervals of pixels.

The groups of bead spacers 320a may be formed under the lower alignment layer 11.

A light blocking member 220 is formed on an insulating substrate 210 and is made of a material such as transparent glass. The light blocking member 220 is called a black matrix, and prevents light leakage. The light blocking member 220 may include a plurality of openings (not shown) that face the pixel electrodes 190, and it may have substantially the same planar shape as the pixel electrodes 190. Alternately, the light blocking member 220 may include linear portions corresponding to the data lines 171 and the gate lines 121, and other portions corresponding to the TFTs.

A plurality of red, green, and blue color filters 230R, 230G, and 230B are formed on the substrate. The color filters 230R, 230G, and 230B are disposed substantially in the areas enclosed by the light blocking member 220, and they may extend substantially in the longitudinal direction along the pixel electrodes 190. The color filters 230 may represent other primary colors.

An overcoat 250 is formed on the light blocking member 220 and the color filters 230R, 230G, and 230B. The overcoat 250 may be made of an organic or inorganic insulating material, which may prevent the color filters 230 from being exposed, and also may provide a flat surface. The overcoat 250 is optional.

A common electrode 270 is formed on the overcoat 250. The common electrode 270 may be made of a transparent conductive material such as ITO and IZO.

An upper alignment layer 21 is coated on the common electrode 270.

A plurality of groups of bead spacers 320b are formed on the upper alignment layer 21. The bead spacers 320b may be formed in a region corresponding to a light blocking member 220, and the bead spacers 320b may be formed in a region corresponding to the TFT.

Six to eight beads form a group of the bead spacers 320b having a round shape. The beads may be the same size. The bead spacers 320b are arranged by one per six pixels. However, the groups of bead spacers 320b may be arranged at variable intervals of pixels. In addition, the number of beads in the group of the bead spacers 320a may be less than six or more than eight, and a shape of the group of the bead spacers 320a may be changed, such as to a quadrangle, etc.

The bead spacers 320b disposed on the common electrode panel 200 have a larger diameter than that of the bead spacers 320a disposed on the TFT array panel 100. The large bead spacers 320b contact both of the two display panels 100 and 200, while the small bead spacers 320b are separated from the common electrode panel 200.

The groups of bead spacers 320a and 320b are disposed by one per three pixels, and the groups of bead spacers 320a and the groups of bead spacers 320b are alternately arranged.

However, the groups of bead spacers 320a having a small size may be disposed around the display area edge, while the groups of bead spacers 320b having a large size may be disposed in the display area.

Although not shown in these Figs., the LCD includes a sealing member 310 disposed at the outermost portion of the LCD, and includes a plurality of groups of small bead spacers 320a and a plurality of groups of large bead spacers 320b alternately disposed in the peripheral area between the display area and the sealing member 310 at regular intervals.

The groups of small bead spacers 320a are disposed on a thin film transistor array panel 100 while groups of large bead spacers 320b are disposed on a common electrode panel 200, but the groups of bead spacers 320a and 320b may be disposed together on one panel of the TFT array panel 100 and the common electrode panel 200.

The lower alignment layer 11 and the upper alignment layer 21 may be a horizontal alignment layer or a vertical alignment layer.

Polarizers (not shown) may be disposed on outer surfaces of the panels 100 and 200 such that their polarization axes may be crossed or parallel. One of the polarizers is optional when the LCD is a reflective LCD.

The LCD may further include at least one retardation film (not shown) for compensating the retardation of the LC layer 3. The LCD may further include a backlight unit (not shown) for supplying light to the LC layer 3 through the polarizers (not shown), the retardation film, and the panels 100 and 200.

Figure 8:
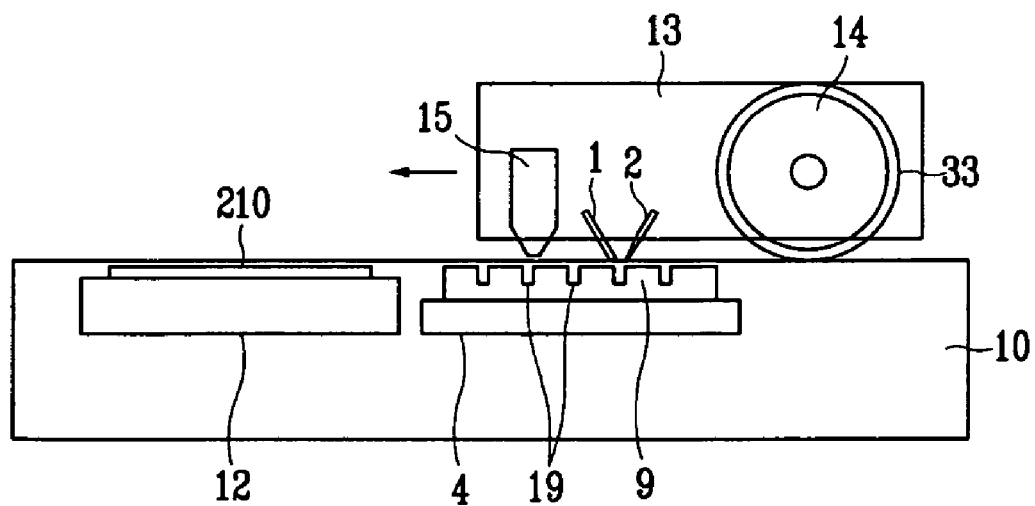
FIG. 8 is a schematic diagram of an apparatus for manufacturing a spacer for an LCD according to an exemplary embodiment of the present invention.

FIG. 8 is a schematic diagram of an apparatus for manufacturing a spacer for an LCD according to an exemplary embodiment of the present invention.

Referring to FIG. 8, the apparatus includes a spacer supply substrate 9, a support plate 12, a transcribing roller 14, a spacer supply device 15, a printing plate 4, and doctor blades 1 and 2.

The spacer supply substrate 9 and support plate 12 are installed at a lower frame 10, and the transfer roller 14 and the spacer supply device 15 are installed at an upper frame 13.

The spacer supply substrate 9 is disposed on the printing plate 4 of the lower frame 10, and the spacer supply substrate 9 has a plurality of holes 19 formed on a surface thereof. The spacer supply substrate 9 may be made of a glass, plastic, or metal material, and the holes 19 may be formed by a metal molding method or a laser processing method.

The holes 19 may have a sufficient size to be filled with six to ten bead spacers (not shown). The size of the holes 19 may be reduced to support less than six bead spacers or increased to support more than ten bead spacers as required by the embodiment of the invention. The holes 19 are arranged at the same intervals as those between groups of bead spacers 320a and 320b. A substrate 210, on which the groups of bead spacers 320a and 320b are to be disposed, is mounted on the support plate 12.

A transcribing sheet 33 made of hydrophilic silicon is attached on the surface of the transcribing roller 14.

The doctor blades 1 and 2 are installed at a rear side of the spacer supply device 15 with respect to its travel direction, and the doctor blades 1 and 2 inject the beads deposited on the spacer supply substrate 9 from the spacer supply device 15 into the holes 19 of the spacer supply substrate 9 equally.

A method of manufacturing bead spacers on a thin film transistor array panel using an apparatus for manufacturing a spacer for an LCD according to an exemplary embodiment of the present invention will be described in detail with reference to FIG. 9 to FIG. 17.

Figure 9:
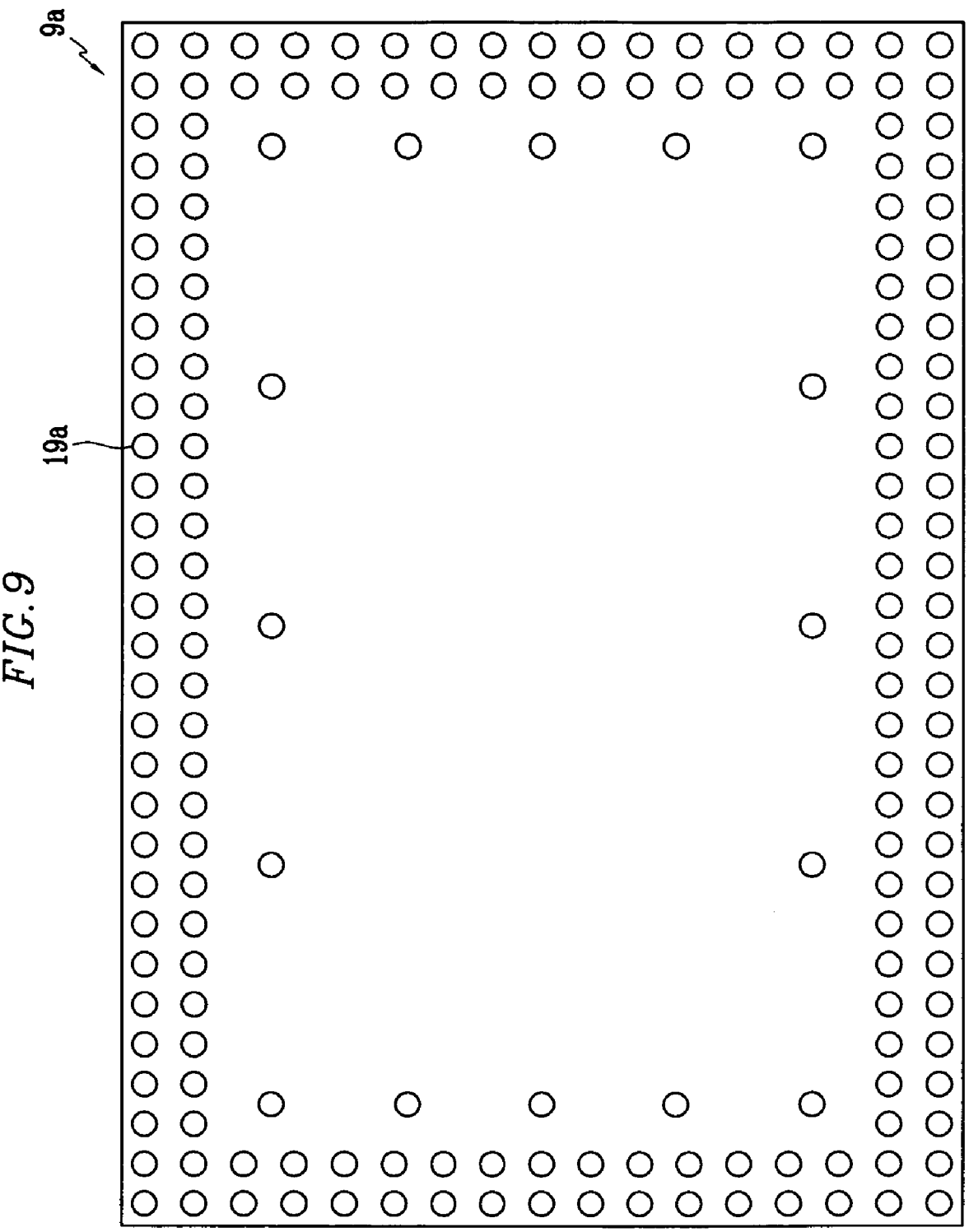
FIG. 9 is a layout view of a first spacer supply substrate according to an exemplary embodiment of the present invention.
Figure 10:
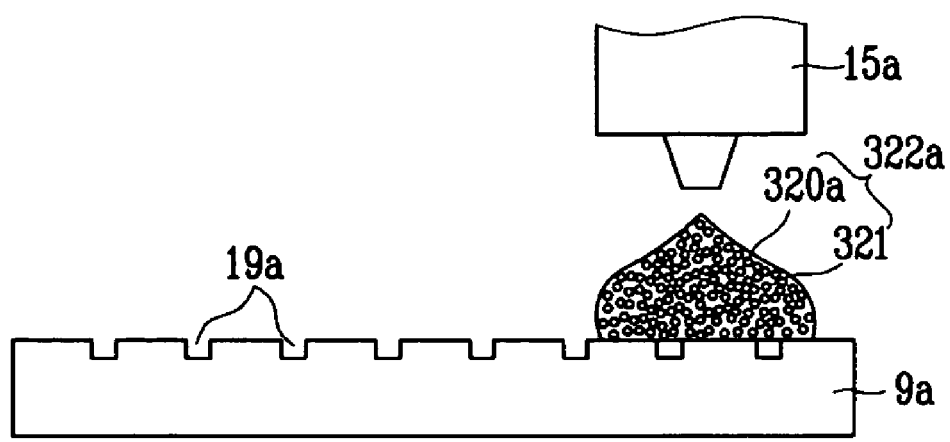
FIG. 10 is a view showing a step of dripping bead spacers onto the first spacer supply substrate according to an exemplary embodiment of the present invention.
Figure 11:
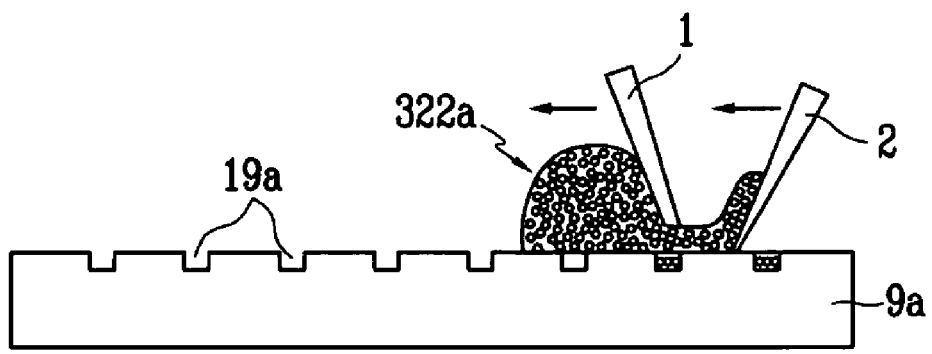
FIG. 11 is a view showing a step of injecting the dripped bead spacers into a plurality of holes of the first spacer supply substrate equally.
Figure 12:
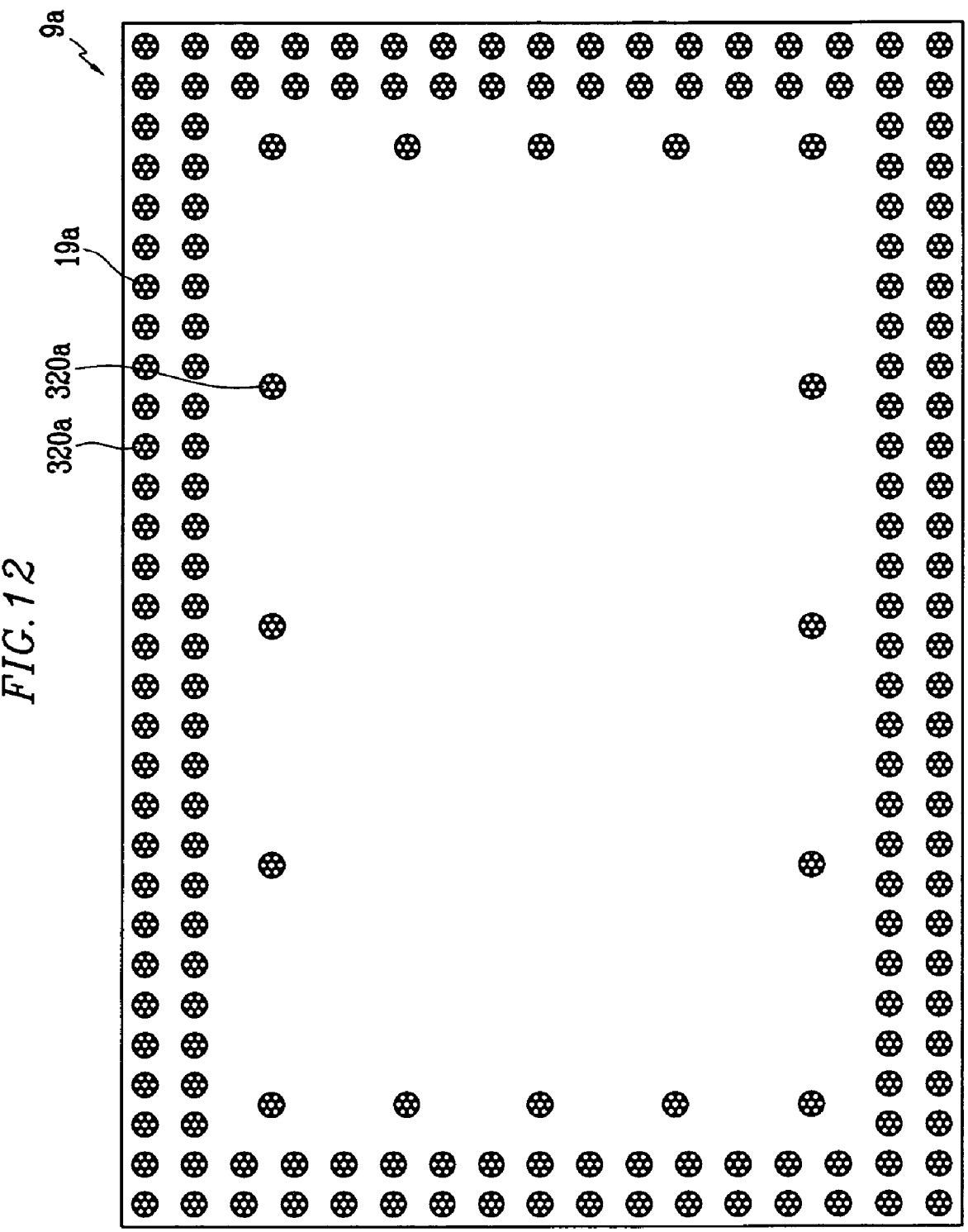
FIG. 12 is a layout view of the first spacer supply substrate in which the bead spacers have been injected into the holes according to an exemplary embodiment of the present invention.
Figure 13:
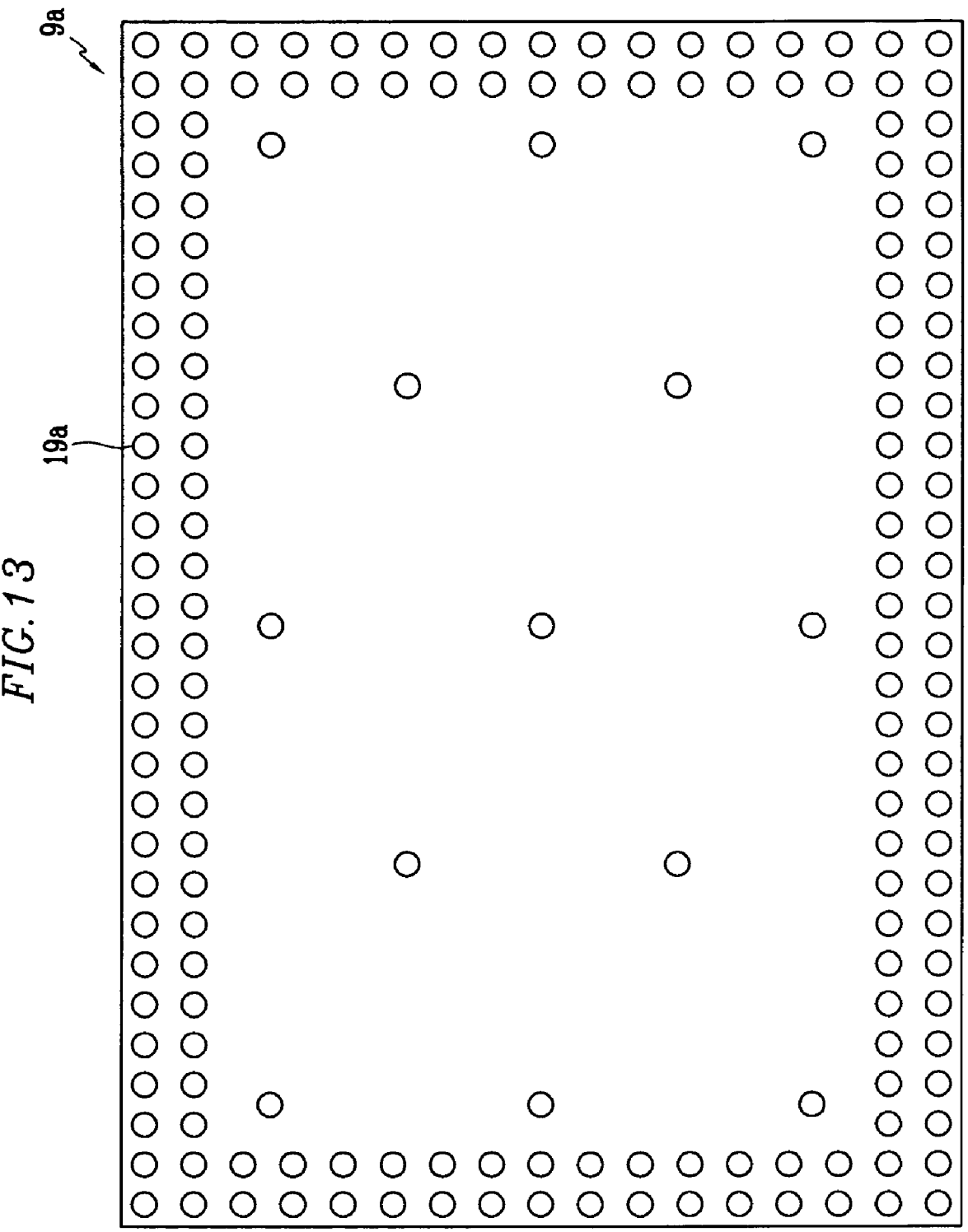
FIG. 13 is a layout view of a first spacer supply substrate according to an exemplary embodiment of the present invention.
Figure 14:
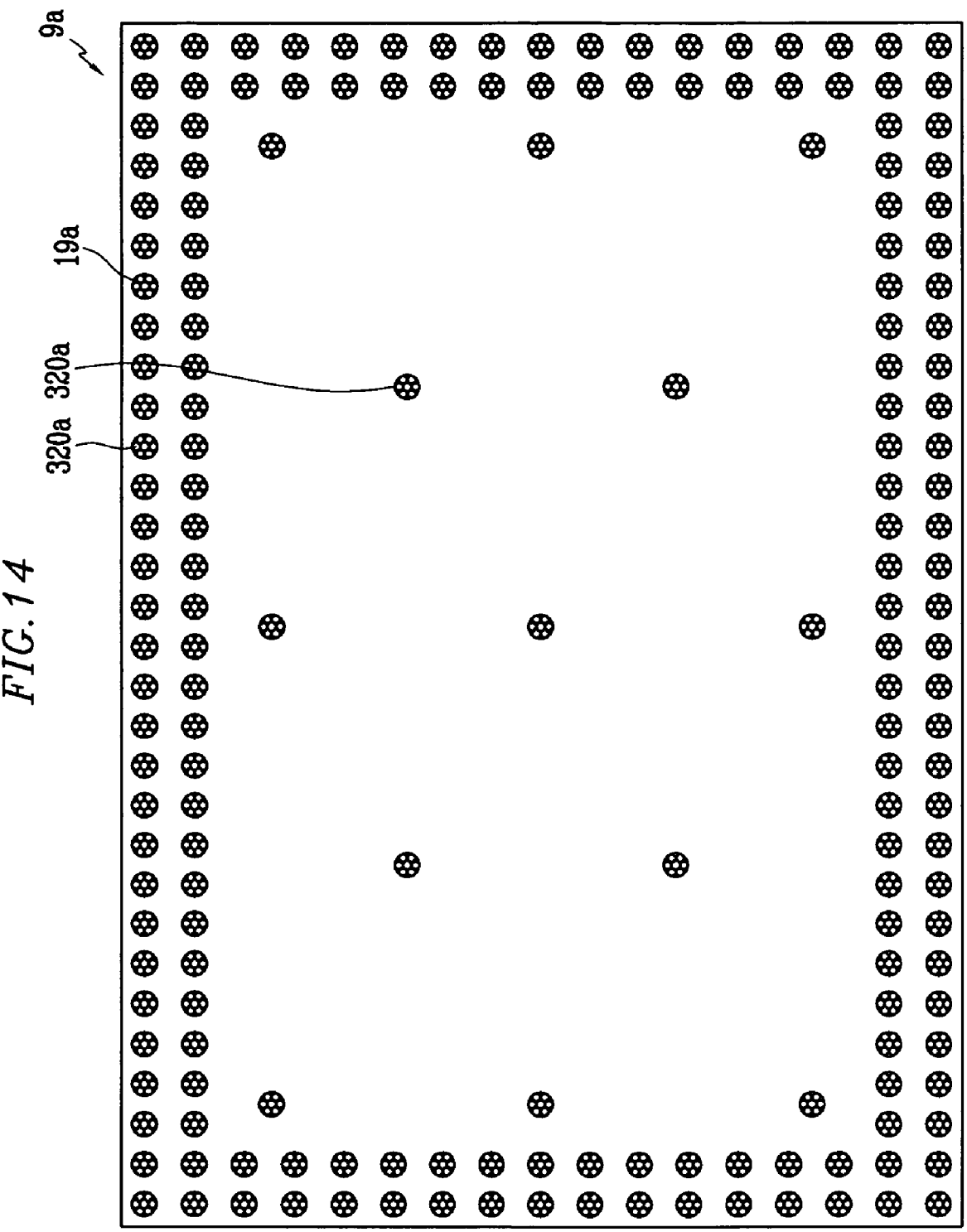
FIG. 14 is a layout view of the first spacer supply substrate in which the bead spacers have been injected into the holes according to an exemplary embodiment of the present invention.
Figure 15:
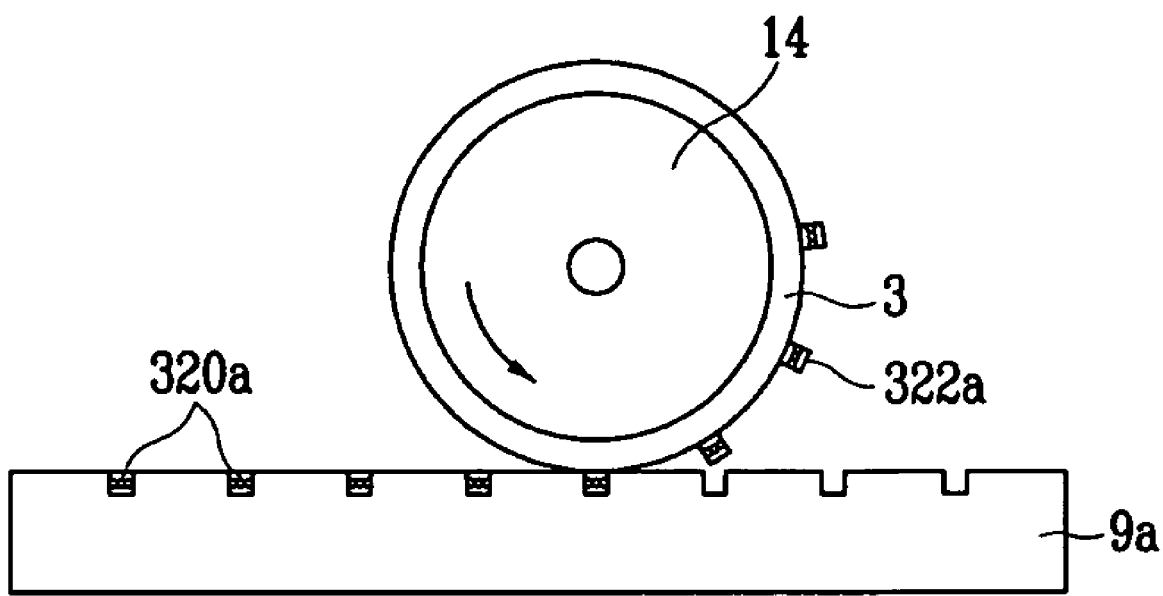
FIG. 15 is a diagram showing a step of transferring the bead spacers from the first spacer supply substrate to a surface of a transfer roller according to an exemplary embodiment of the present invention.
Figure 16:
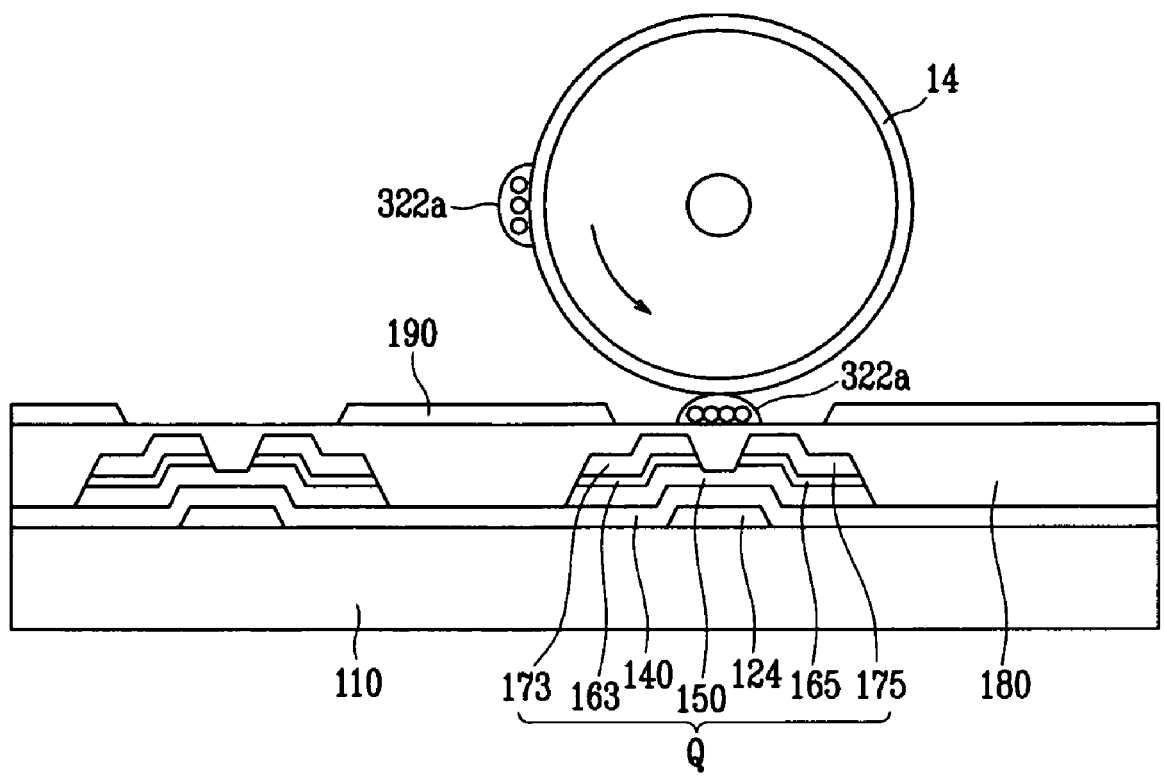
FIG. 16 is a diagram showing a step of transferring the bead spacers that are transferred to the transfer roller, from the transfer roller surface onto a thin film transistor array panel according to an exemplary embodiment of the present invention.
Figure 17:
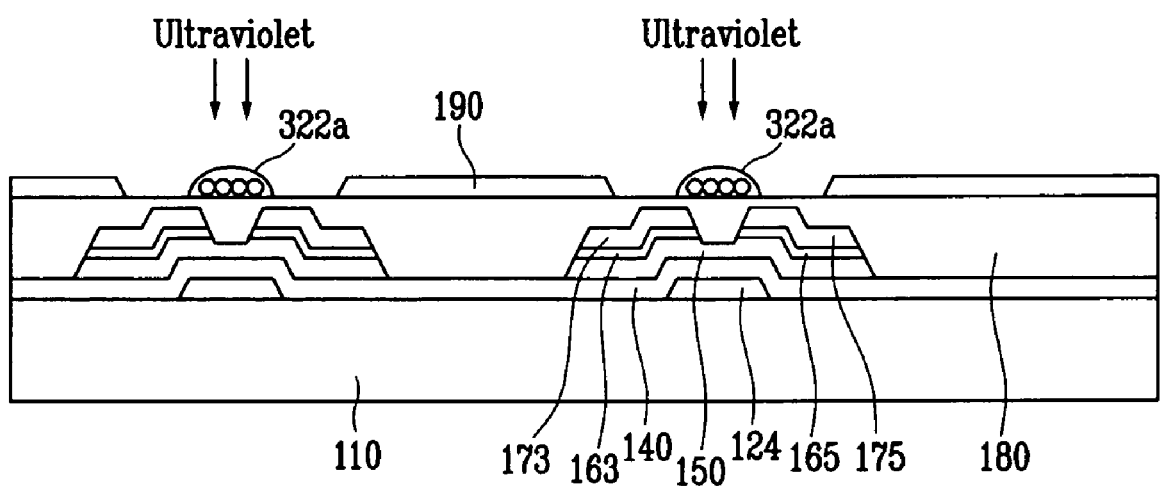
FIG. 17 is a diagram showing a step of hardening the bead spacers disposed on the thin film transistor array panel according to an exemplary embodiment of the present invention.

FIG. 9 is a layout view of a first spacer supply substrate according to an exemplary embodiment of the present invention, FIG. 10 is a view showing a step of depositing bead spacers to the first spacer supply substrate according to an exemplary embodiment of the present invention, and FIG. 11 is a view showing a step of injecting the dripped bead spacers into a plurality of holes of the first spacer supply substrate equally. FIG. 12 is a layout view of the first spacer supply substrate in which the bead spacers have been injected into the holes according to an exemplary embodiment of the present invention. FIG. 13 is a layout view of a first spacer supply substrate according to an exemplary embodiment of the present invention, FIG. 14 is a layout view of the first spacer supply substrate in which the bead spacers have been injected into the holes according to an exemplary embodiment of the present invention, and FIG. 15 is a diagram showing a step of transferring the bead spacers from the first spacer supply substrate to a surface of a transfer roller according to an exemplary embodiment of the present invention. FIG. 16 is a diagram showing a step of transferring the bead spacers that are transferred to the transfer roller, from the transfer roller surface onto a thin film transistor array panel according to an exemplary embodiment of the present invention, and FIG. 17 is a diagram showing a step of hardening the bead spacers disposed on the thin film transistor array panel according to an exemplary embodiment of the present invention.

Referring to FIG. 9 and FIG. 13, first spacer supply substrates 9a have a plurality of holes 19a arranged at the same disposition as that of groups of bead spacers 320a to be disposed on a thin film transistor array panel 100 according to an exemplary embodiment of the present invention.

As shown in FIG. 10, a mixture 322a, which includes a plurality of beads 321a and a thermosetting material or an ultraviolet hardener 321, is deposited on the first spacer supply substrate 9a having a plurality of holes 19a using the spacer supply device 15a.

The beads 321a may include an organic material having a low dielectric constant such as an acryl-based (acrylic) organic compound that can be polymerized, Teflon, benzocyclobutene (BCB), or perfluorocyclobutene (PFCB).

The thermosetting material or the ultraviolet hardener 321 causes the groups of bead spacers 320a to attach to the panel.

Referring to FIG. 11, the mixture 322a is injected into the plurality of holes 19a formed on the first spacer supply substrate 9a using the doctor blades 1 and 2. Each of the holes 19a is filled with a plurality of beads 321a, for example six to ten beads 321a.

Referring to FIG. 12, the groups of bead spacers 320a are injected in a region corresponding to the peripheral area between the display area and the sealing member 310 at regular intervals, and are injected along the edge of the display area in the spacer supply substrate 9a.

Referring to FIG. 14, the groups of bead spacers 320a are injected in the region corresponding to the peripheral area between the display area and the sealing member 310, similar to the spacer supply substrate 9a shown in FIG. 12, while the groups of bead spacers 320a are injected in a region corresponding to the display area at regular intervals, differently from the spacer supply substrate 9a shown in FIG. 12.

However, the number and disposition of the holes 19a may be variously changed depending on disposition of the groups of the bead spacers 320a arranged on the LCD.

As shown in FIG. 15, the groups of bead spacers 320a injected in the holes 19a of the first spacer supply substrate 9a are transcribed onto the transcribing sheet 33 of the transcribing roller 14 by rotating the transcribing roller 14 in one direction. The groups of bead spacers 320a are attached on the transcribing sheet 33 of the transcribing roller 14 at the same interval to that of the holes 19a.

Referring to FIG. 16, the transcribing roller 14 having the groups of bead spacers 320a attached on the surface thereof rotates in a direction on the substrate 110 to transcribe the groups of bead spacers 320a onto the substrate 110. In this way, the groups of bead spacers 320a are attached on the substrate 110 at predetermined locations.

A thin film transistor Q, which includes a gate electrode 124, a gate insulating layer 140, a semiconductor layer 150, an ohmic contact layer 160, a source electrode 173, and a drain electrode 175, respectively, a passivation layer 180, and pixel electrodes 190 may be formed on the substrate 110. The groups of bead spacers 320a may be disposed in an area corresponding to the thin film transistor Q or the groups of bead spacers 320a may be disposed in an area corresponding to a light blocking member 220 to prevent light leakage.

The groups of bead spacers 320a may be disposed in the peripheral area between the display area and the sealing member 310 of an LCD. The groups of bead spacers 320a maintain a constant cell gap and control the velocity of the liquid crystal material in several directions to prevent the liquid crystal material from contacting the sealing member 310 before the sealing member 310 is hardened.

As shown in FIG. 17, the groups of bead spacers 320a attached on the thin film transistor substrate 110 are hardened by heat or light such as ultraviolet rays to be firmly attached on the thin film transistor substrate 110.

After the groups of bead spacers 320a are attached on the thin film transistor substrate 110, an alignment layer (not shown) may be formed thereon. Alternately, an alignment layer (not shown) may be formed on the thin film transistor substrate 110, and then the groups of bead spacers 320a may be attached.

Methods of manufacturing spacers on a common electrode panel of an LCD according to exemplary embodiments of the present invention will be described in detail with reference to FIG. 18 to FIG. 27.

Figure 18:
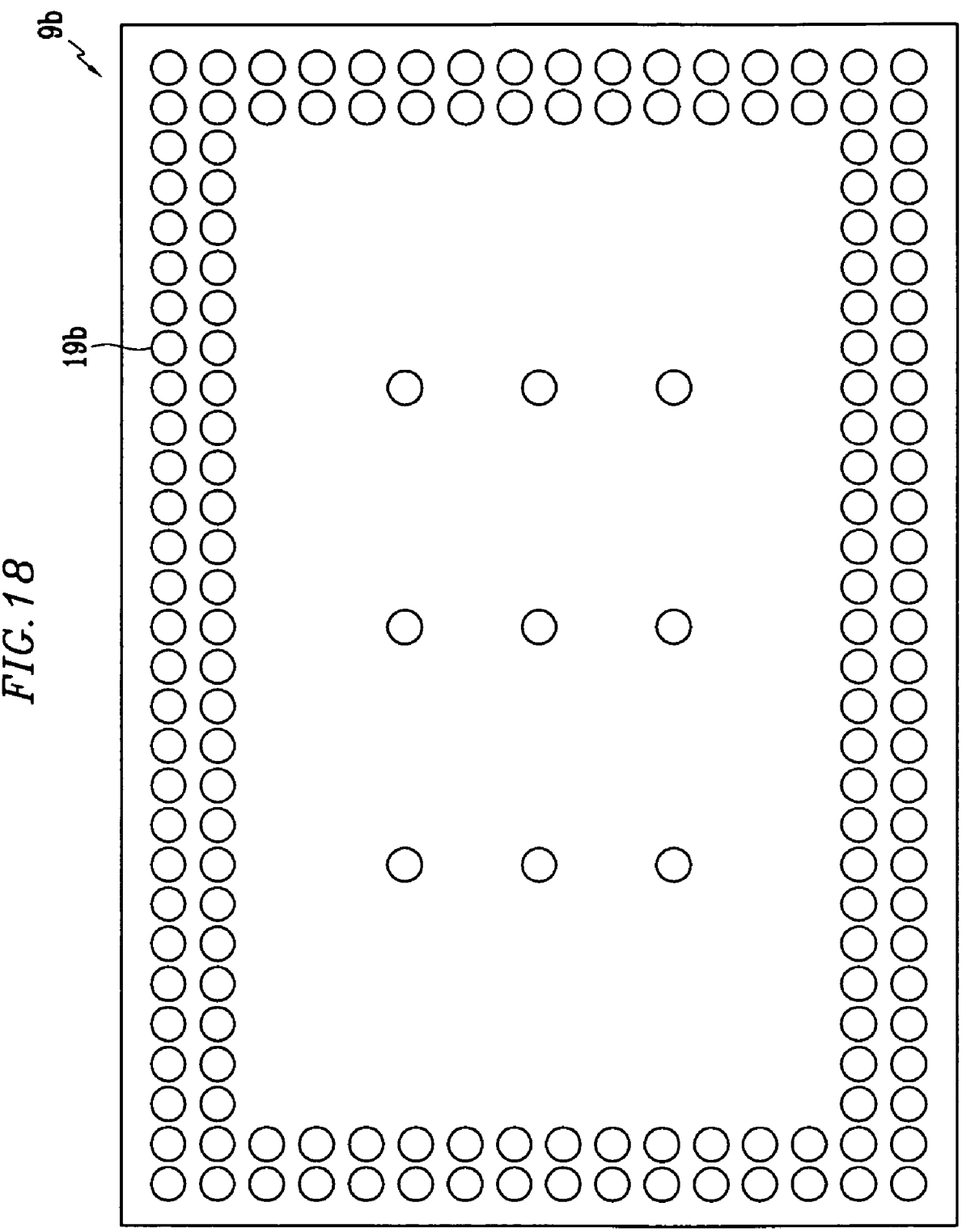
FIG. 18 is a layout view of a second spacer supply substrate according to an exemplary embodiment of the present invention.
Figure 19:
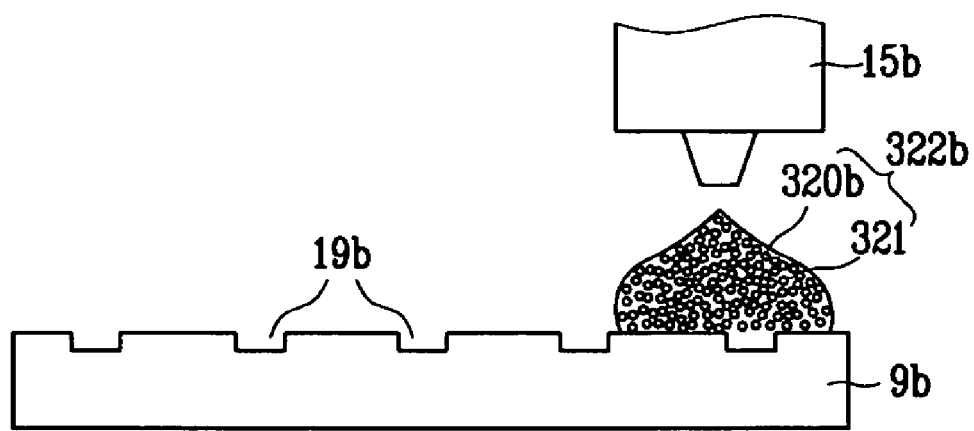
FIG. 19 is a view showing a step of dripping bead spacers to the second spacer supply substrate according to an exemplary embodiment of the present invention.
Figure 20:
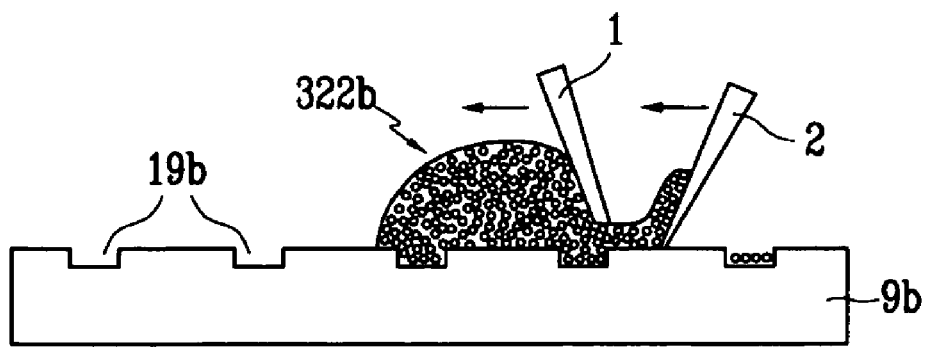
FIG. 20 is a view showing a step of injecting the dripped bead spacers into a plurality of holes of the second spacer supply substrate equally.
Figure 21:
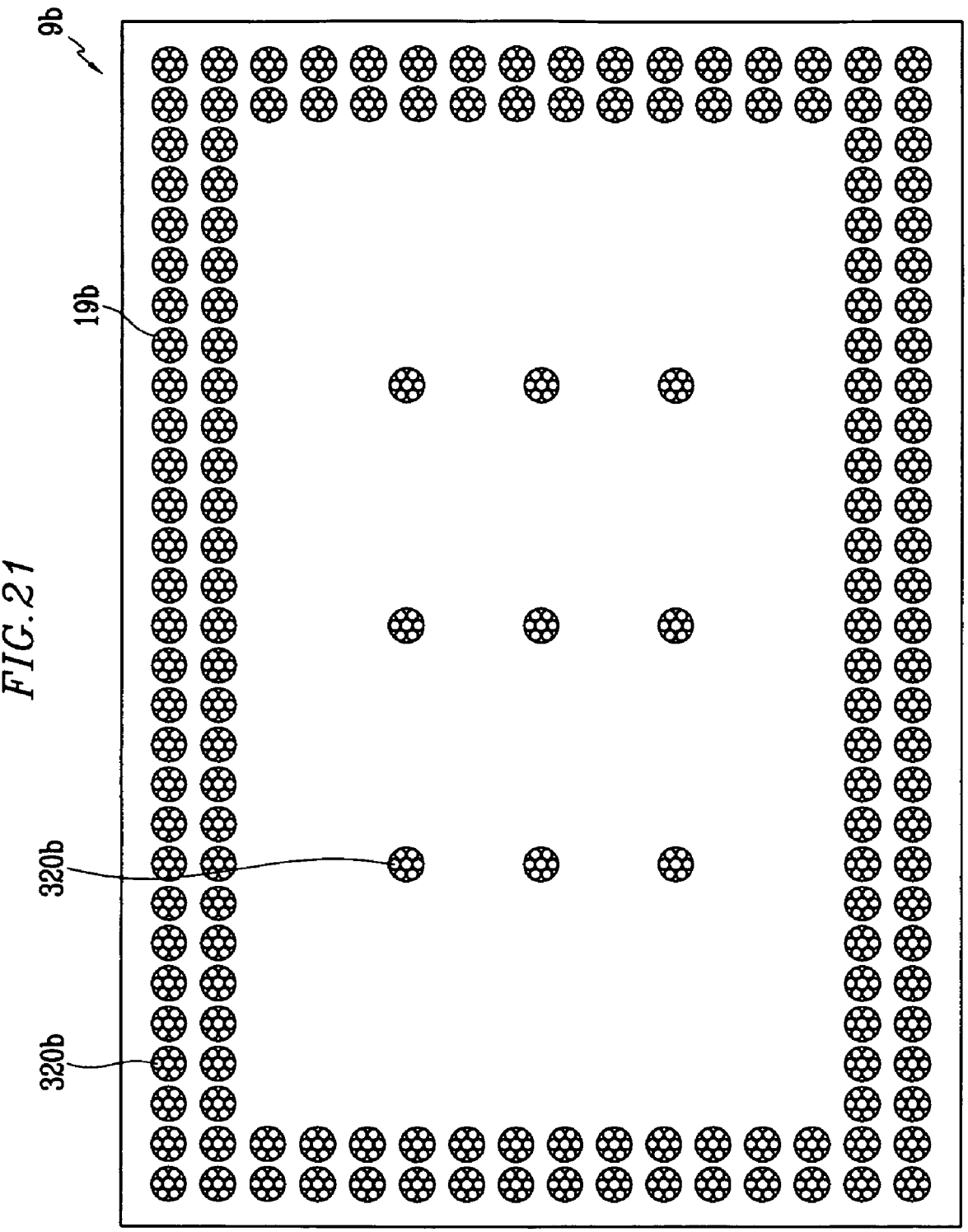
FIG. 21 is a layout view of the second spacer supply substrate in which the bead spacers have been injected into the holes according to an exemplary embodiment of the present invention.
Figure 22:
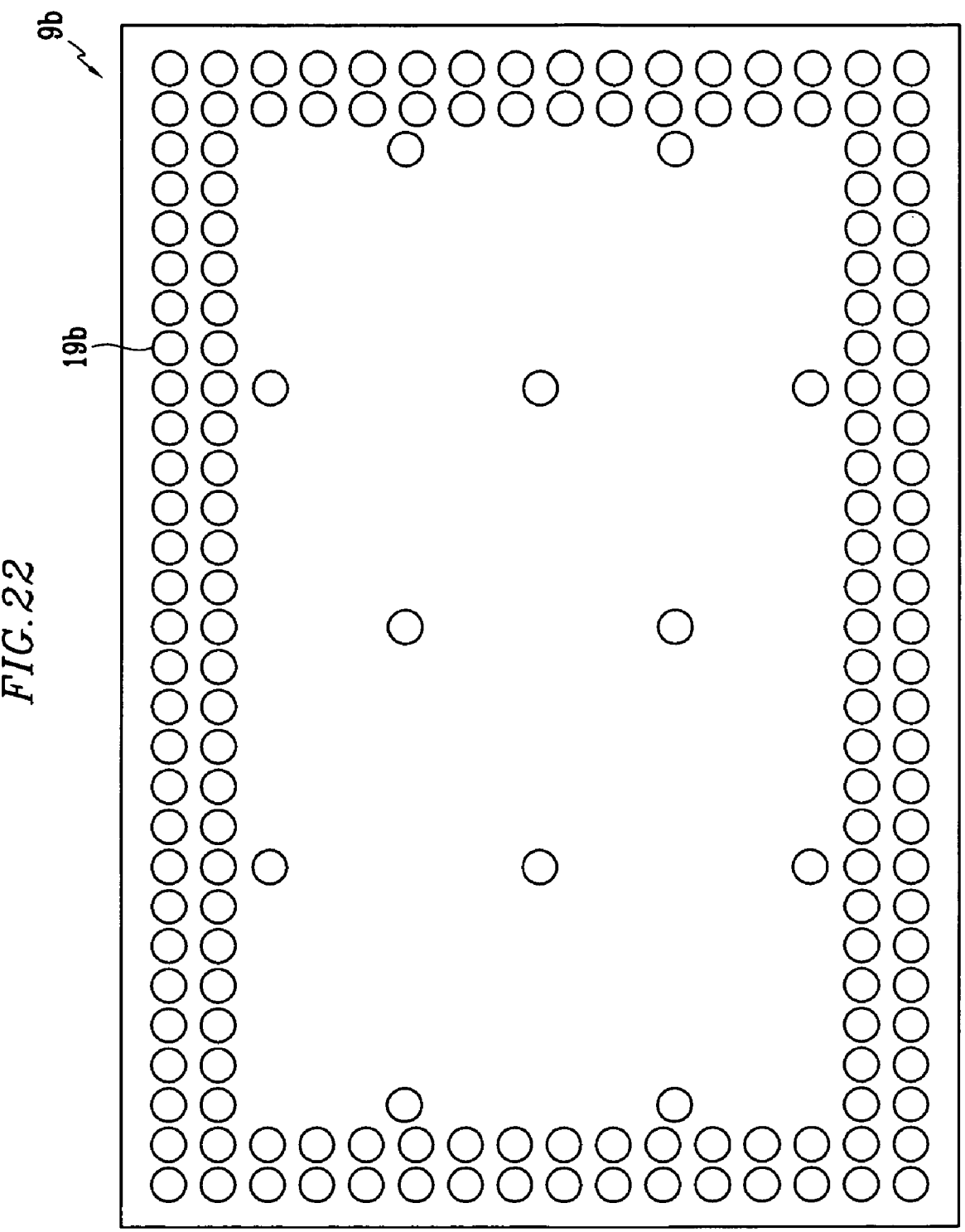
FIG. 22 is a layout view of a second spacer supply substrate according to an exemplary embodiment of the present invention.
Figure 23:
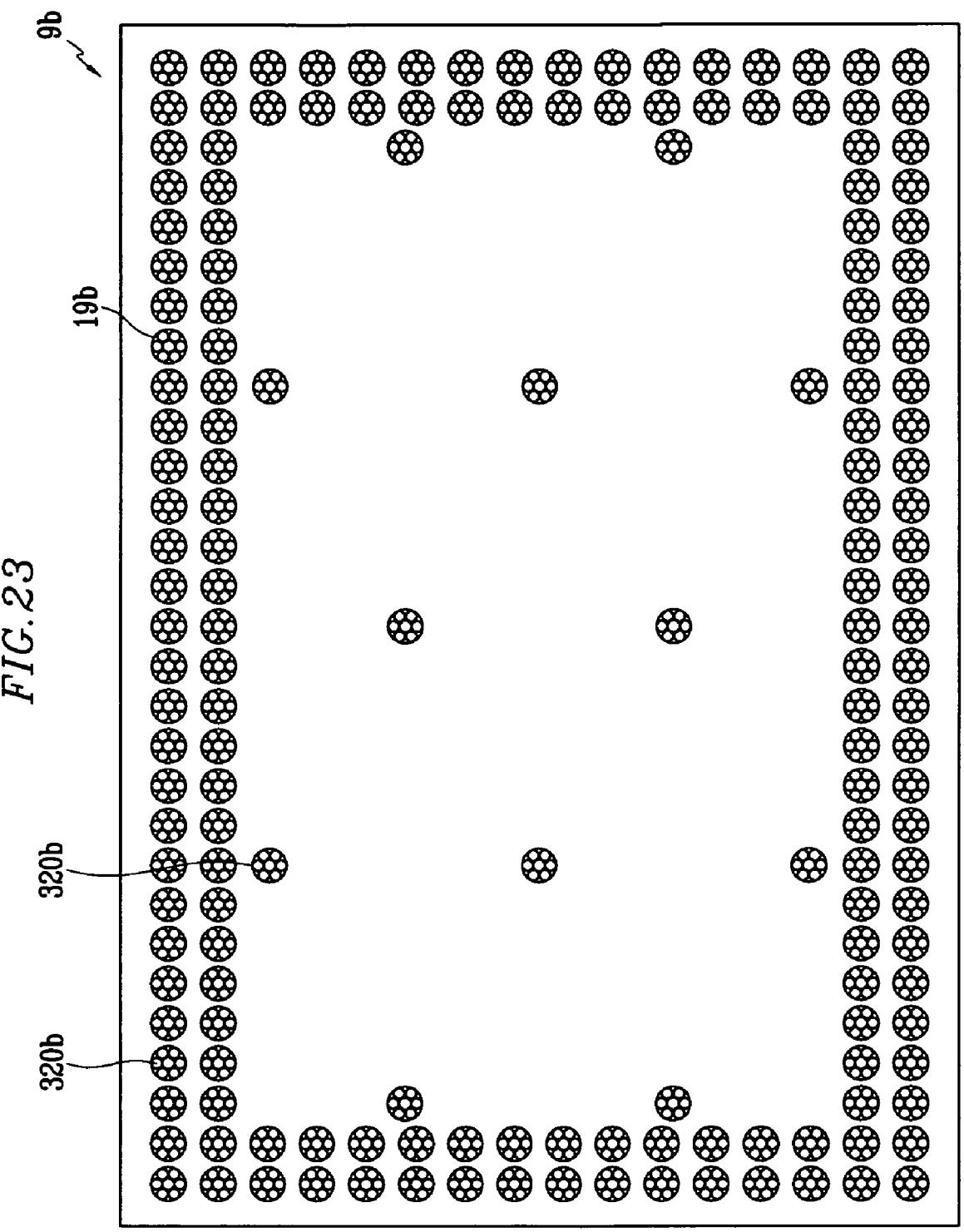
FIG. 23 is a layout view of the second spacer supply substrate in which the bead spacers have been injected into the holes according to an exemplary embodiment of the present invention.
Figure 24:
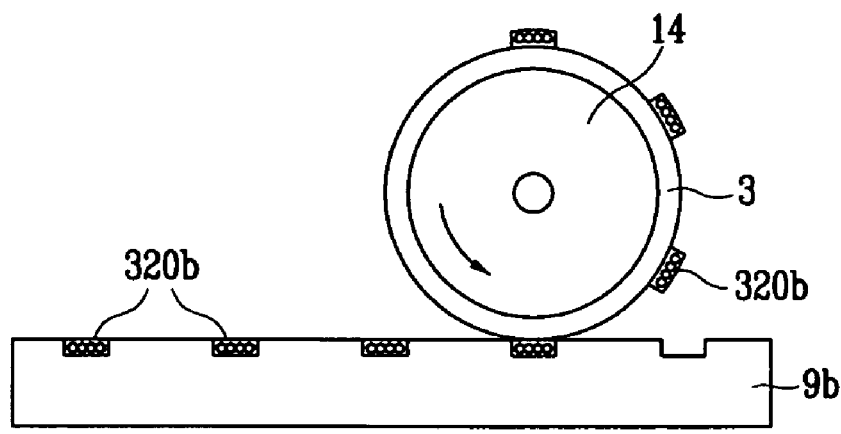
FIG. 24 is a diagram showing a step of transferring the bead spacers from the second spacer supply substrate to a surface of a transfer roller according to an exemplary embodiment of the present invention.
Figure 25:
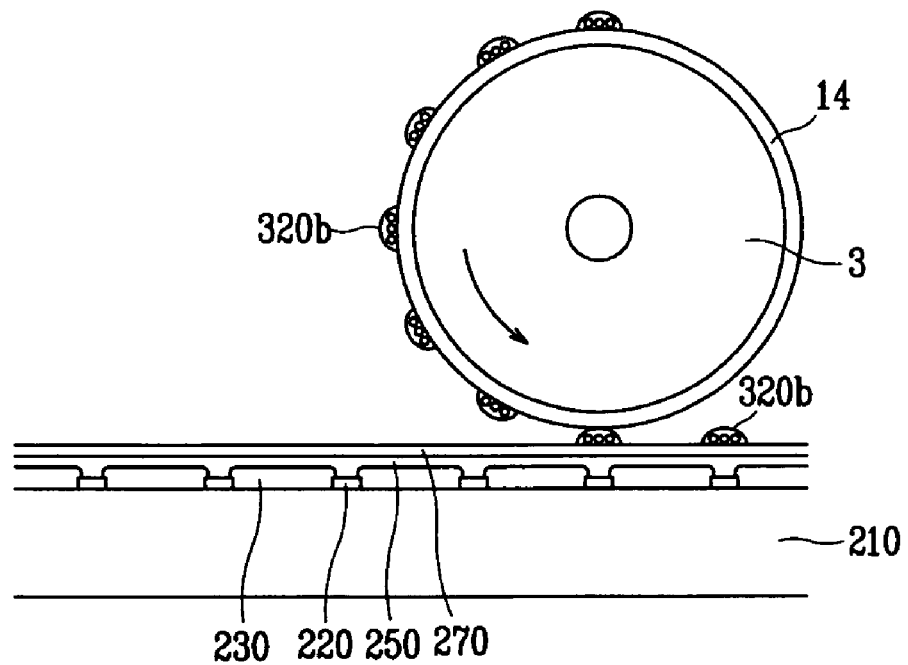
FIG. 25 a diagram showing a step of transferring the bead spacers that are transferred to the transfer roller, from the transfer roller surface onto a common electrode panel according to an exemplary embodiment of the present invention.
Figure 26:
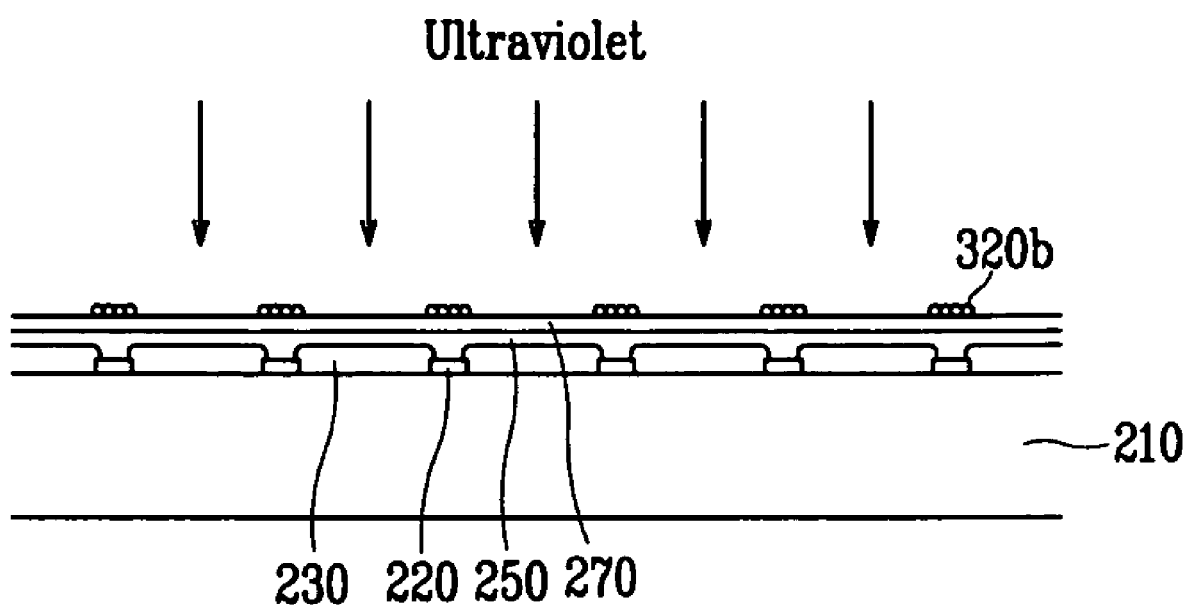
FIG. 26 is a diagram showing a step of hardening the bead spacers disposed on the common electrode panel according to an exemplary embodiment of the present invention.
Figure 27:
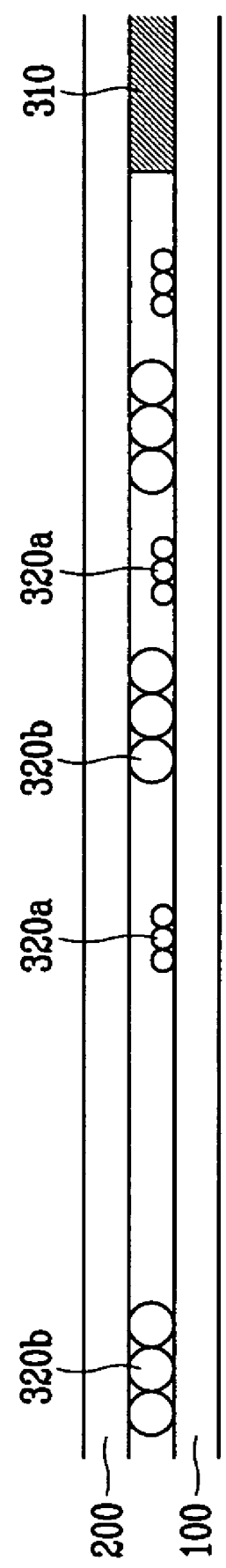
FIG. 27 is a diagram showing a step of combining the thin film transistor array panel and the common electrode panel having the hardened bead spacers, respectively, according to an exemplary embodiment of the present invention.

FIG. 18 is a layout view of a second spacer supply substrate according to an exemplary embodiment of the present invention, FIG. 19 is a view showing a step of depositing bead spacers to the second spacer supply substrate according to an exemplary embodiment of the present invention, and FIG. 20 is a view showing a step of injecting the dripped bead spacers into a plurality of holes of the second spacer supply substrate equally. FIG. 21 is a layout view of the second spacer supply substrate in which the bead spacers have been injected into the holes according to an exemplary embodiment of the present invention. FIG. 22 is a layout view of a second spacer supply substrate according to an exemplary embodiment of the present invention, FIG. 23 is a layout view of the second spacer supply substrate in which the bead spacers have been injected into the holes according to an exemplary embodiment of the present invention, and FIG. 24 is a diagram showing a step of transferring the bead spacers from the second spacer supply substrate to a surface of a transfer roller according to an exemplary embodiment of the present invention. FIG. 25 a diagram showing a step of transferring the bead spacers that are transferred to the transfer roller, from the transfer roller surface onto a common electrode panel according to an exemplary embodiment of the present invention, FIG. 26 is a diagram showing a step of hardening the bead spacers disposed on the common electrode panel according to an exemplary embodiment of the present invention, and FIG. 27 is a diagram showing a step of combining the thin film transistor array panel and the common electrode panel having the hardened bead spacers, respectively, according to an exemplary embodiment of the present invention.

The methods of manufacturing spacers on the common electrode panel is similar to the methods of manufacturing spacers on the thin film transistor panel shown in FIG. 9 to FIG. 17. However, if the size of the beads disposed on the common electrode panel are different from those disposed on the thin film transistor substrate, holes formed in a second spacer supply substrate may have a different size from those formed in the first spacer supply substrate, and the disposition of the holes may be different from those in the thin film transistor substrate.

Referring to FIG. 18 and FIG. 22, second spacer supply substrates 9b have a plurality of holes 19b arranged at substantially the same disposition as that of groups of bead spacers 320b to be disposed on a common electrode panel 200 according to an exemplary embodiment of the present invention.

As shown in FIG. 19, a mixture 322b of a plurality of beads 321b and a thermosetting material or an ultraviolet hardener 321 is deposited on the second spacer supply substrate 9b using the spacer supply device 15b.

The beads 321b may include an organic material having a low dielectric constant such as an acryl-based (acrylic) organic compound that can be polymerized, such as Teflon, benzocyclobutene (BCB), or perfluorocyclobutene (PFCB).

The beads 321b may have a different size or elasticity from those of the beads 321a described in FIG. 9 to FIG. 17. For example, the beads 321b may be bigger than the beads 321a. The beads 321a and the beads 321b may have the same size but different elasticity, i.e., the beads 321b may have a lower elasticity coefficient than the beads 321a.

As shown in FIG. 20, the mixture 322b is injected into the plurality of holes 19b formed on the second spacer supply substrate 9b using the doctor blades 1 and 2. Each hole 19b is filled with a plurality of beads 321b, for example six to ten beads 321b.

If the groups of bead spacers 320b are bigger than the groups of bead spacers 320a, the size of the holes 19b formed in the second spacer supply substrate 9b are bigger than that of the holes 19a.

Referring to FIG. 21, the groups of bead spacers 320b are injected in a region corresponding to the peripheral area between the display area and the sealing member 310 at regular intervals, and the groups of bead spacers 320b are injected in a region corresponding to the display area at regular intervals. As shown in FIG. 22, the groups of bead spacers 320b are injected in the region corresponding to the peripheral area between the display area and the sealing member 310, similar to the spacer supply substrate 9b shown in FIG. 21, and the groups of bead spacers 320b are injected in the entire display area at regular intervals.

However, the number and disposition of the holes 19b may be variously changed depending on the disposition of the groups of the bead spacers 320b arranged on the LCD.

As shown in FIG. 24, the groups of bead spacers 320b injected in the holes 19b of the second spacer supply substrate 9b are transcribed onto the transcribing sheet 33 of the transcribing roller 14 by rotating the transcribing roller 14 in one direction. The groups of bead spacers 320b are attached on the transcribing sheet 33 of the transcribing roller 14 at the same intervals as those of the holes 19b.

Referring to FIG. 25, the transcribing roller 14 having the groups of bead spacers 320b attached on the surface thereof rotates in a direction on the substrate 210 to transcribe the groups of bead spacers 320b onto the substrate 210.

In this way, the groups of bead spacers 320b are attached on the substrate 210 at predetermined locations.

Color filters 230, light blocking members 220, an overcoat 250, and a common electrode 270 may be formed on the substrate 210. The groups of bead spacers 320b may be disposed on the blocking member 220.

The groups of bead spacers 320b may be disposed in the peripheral area between the display area and the sealing member 310 of an LCD. The groups of bead spacers 320a disposed in the peripheral area between the display area and the sealing member 310 of an LCD may maintain a constant cell gap and may control the velocity of the liquid crystal material in several directions to prevent the liquid crystal material from contacting the sealing member 310 before the sealing member 310 is hardened.

The groups of bead spacers 320b may be disposed such that the groups of bead spacers 320b do not overlap the groups of bead spacers 320a.

An alignment layer (not shown) may be formed after the groups of bead spacers 320b are attached on substrate 210, or the groups of bead spacers 320b may be attached after the alignment layer is formed.

As shown in FIG. 26, the groups of bead spacers 320b attached on the common electrode substrate 210 are hardened by heat or light such as ultraviolet rays.

Referring to FIG. 27, two display panels 100 and 200 are combined with the groups of bead spacers 320a and 320b.

The sealing member 310 is formed at the outermost portion of one of the display panels 100 and 200, a liquid crystal material (not shown) is deposited in the display area enclosed by the groups of the bead spacers 320a and 320b, and then the display panels 100 and 200 are aligned and pressed to be combined.

As shown in FIG. 27, a plurality of groups of bead spacers 320a and a plurality of groups of bead spacers 320b are closely and alternately disposed in the peripheral area between the display area and the sealing member 310 at regular intervals, and the groups of bead spacers 320a and 320b are disposed in the display area at regular intervals such as one per a plurality of pixels.

The groups of bead spacers 320a and 320b may be attached to one of the display panels 100 and 200.

In a manufacturing method of an LCD, according to an exemplary embodiment of the present invention, the groups of bead spacers 320a and 320b may be simultaneously formed on a desired position. In addition, the groups of bead spacers 320a and 320b may be closely disposed in the peripheral area between the display area and the sealing member 310 to act as a dam for preventing the liquid crystal material from contacting the unhardened sealant.

Having described exemplary embodiments of the present invention, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) comprising:
a first substrate having a display area and a peripheral area and including a plurality of pixels formed in the display area;
a second substrate facing the first substrate; and
a plurality of first bead spacers and a plurality of second bead spacers disposed between the first substrate and the second substrate, wherein the first bead spacers have a different size from that of the second bead spacers, and the first bead and the second bead spacers are disposed in the display area.

2. The LCD of claim 1, further comprising a plurality of light blocking members formed on the second substrate and overlapping the second bead spacers.

3. The LCD of claim 1, wherein the first bead spacers do not overlap the second bead spacers.

4. The LCD of claim 1, wherein the first bead spacers are disposed near the center of the display area, and the second bead spacers are disposed about an edge of the display area.

5. The LCD of claim 1, wherein the first bead spacers and the second bead spacers are arranged by one per six pixels, respectively.

6. The LCD of claim 5, wherein the first bead spacers and the second bead spacers disposed in the display area are alternately arranged by one per three pixels.

7. The LCD of claim 1, wherein the first bead spacers and the second bead spacers are disposed on the first substrate and the second substrate, respectively.

8. The LCD of claim 1, wherein the first bead spacers and the second bead spacers are attached to one of the first and second substrates.

9. The LCD of claim 1, further comprising: a gate line and a data line formed on the first substrate; a thin film transistor connected to the gate line and the data line; and a pixel electrode connected to the thin film transistor.

10. The LCD of claim 1, further comprising: a color filter formed on the second substrate; and a common electrode formed on the color filter.

11. The LCD of claim 1, wherein the first bead spacers have a smaller size than that of the second bead spacers.

12. The LCD of claim 1, wherein the first bead spacers have a different coefficient from that of the second bead spacers.

13. The LCD of claim 1, further comprising: a sealing member disposed at an edge of the peripheral area, and wherein the first substrate and the second substrate are combined.

14. The LCD of claim 13, wherein the second bead spacers are disposed near the center of the display area and in the peripheral area between the display area and the sealing member, and the first bead spacers are disposed at an edge of the display area and in the peripheral area between the display area and the sealing member.

15. The LCD of claim 14, wherein the first bead spacers and the second bead spacers disposed in the peripheral area between the display area and the sealing member are alternately arranged at regular intervals.

16. The LCD of claim 14, wherein the first bead spacers and the second bead spacers disposed in the display area are arranged by one per three pixels, and the first bead spacers and the second bead spacers disposed at the peripheral area between the display area and the sealing member are closely and alternately arranged.

17. The LCD of claim 12, wherein the beads of the first bead spacers has a lower elasticity coefficient than that of the beads of the second bead spacers.

18. The LCD of claim 1, wherein the first bead spacers comprises a plurality of first groups of bead spacers and the second bead spacers comprises a plurality of second groups of bead spacers.

19. The LCD of claim 18, wherein the first groups of bead spacers and the second groups of bead spacers are arranged by one per six pixels, respectively.

20. The LCD of claim 18, wherein the first groups of bead spacers and the second groups of bead spacers are alternately arranged by one per three pixels.

21. The LCD of claim 18, further comprising: a sealing member disposed at an edge of the peripheral area, and wherein the first substrate and the second substrate are combined.

22. The LCD of claim 21, wherein the second groups of bead spacers are disposed near the center of the display area and in the peripheral area between the display area and the sealing member, and the first groups of bead spacers are disposed at an edge of the display area and in the peripheral area between the display area and the sealing member.

23. The LCD of claim 21, wherein the first groups of bead spacers and the second groups of bead spacers disposed in the peripheral area between the display area and the sealing member are alternately arranged at regular intervals.

24. The LCD of claim 21, wherein the first groups of bead spacers and the second groups of bead spacers disposed in the display area are arranged by one per three pixels, and the first groups of bead spacers and the second groups of bead spacers disposed at the peripheral area between the display area and the sealing member are closely and alternately arranged.

25. The LCD of claim 18, wherein the first groups of bead spacers and the second groups of bead spacers have a hexagonal shape.

26. The LCD of claim 18, wherein the first groups of bead spacers and the second groups of bead spacers have a circular shape.

* * * * *